US012285380B2

(12) United States Patent
Burns et al.

(10) Patent No.: US 12,285,380 B2
(45) Date of Patent: Apr. 29, 2025

(54) BODYWEIGHT STABILIZING UNLOADING LOCOMOTIVE DEVICE

(71) Applicants: Richard S. Burns, Phoenix, AZ (US); Andrew J. D. Burns, Bend, OR (US)

(72) Inventors: Richard S. Burns, Phoenix, AZ (US); Andrew J. D. Burns, Bend, OR (US)

( * ) Notice: Subject to any disclaimer, the term of this patent is extended or adjusted under 35 U.S.C. 154(b) by 211 days.

(21) Appl. No.: 18/130,292

(22) Filed: Apr. 3, 2023

(65) Prior Publication Data

US 2023/0233400 A1 Jul. 27, 2023

Related U.S. Application Data

(63) Continuation-in-part of application No. 17/362,799, filed on Jun. 29, 2021, now Pat. No. 11,617,704, which is a continuation-in-part of application No. 17/160,221, filed on Jan. 27, 2021, now Pat. No. 11,071,677.

(60) Provisional application No. 62/967,011, filed on Jan. 28, 2020.

(51) Int. Cl.
*A61H 3/04* (2006.01)
*A61H 1/00* (2006.01)

(52) U.S. Cl.
CPC ............... *A61H 3/04* (2013.01); *A61H 1/001* (2013.01)

(58) Field of Classification Search
CPC .............. A61H 3/04; A61H 2201/1418; A61H 2201/1652; A61H 2003/007
See application file for complete search history.

(56) References Cited

U.S. PATENT DOCUMENTS

| | | | | |
|---|---|---|---|---|
| 2,327,671 | A * | 8/1943 | Rupprecht | A61H 3/04 482/67 |
| 5,704,881 | A * | 1/1998 | Dudley | A63B 21/00181 482/69 |
| 6,302,828 | B1 * | 10/2001 | Martin | A61H 3/04 482/69 |
| 7,998,040 | B2 * | 8/2011 | Kram | A63B 21/055 482/54 |
| 9,795,531 | B2 * | 10/2017 | Topcu | A61H 3/008 |
| 2005/0239613 | A1 * | 10/2005 | Colombo | A63B 71/0009 482/94 |
| 2010/0006737 | A1 | 1/2010 | Colombo et al. | |
| 2016/0296409 | A1 | 10/2016 | Schraudolph et al. | |
| 2021/0322254 | A1 | 10/2021 | Burns et al. | |

* cited by examiner

*Primary Examiner* — Noah Chandler Hawk
(74) *Attorney, Agent, or Firm* — Thomas W. Galvani, P.C.; Thomas W. Galvani

(57) ABSTRACT

A bodyweight stabilizing locomotive device includes a frame configured to support locomotive movement and a stabilizing assembly carried by the frame. The stabilizing assembly has a first spring assembly with a first spring constant, a second spring assembly with a second spring constant different from the first spring constant, and a third spring assembly with a third spring constant different from the first and second spring constants. At least one of the first, second, and third spring assemblies includes lockout means which prevent extension of the one of the first, second, and third spring assemblies beyond a maximum extension.

20 Claims, 17 Drawing Sheets

BODYWEIGHT STABILIZING UNLOADING LOCOMOTIVE DEVICE

CROSS-REFERENCE TO RELATED APPLICATIONS

This application is a continuation-in-part of and claims the benefit of prior U.S. patent application Ser. No. 17/362,799, filed Jun. 29, 2021, which is a continuation-in-part of and claims the benefit of prior U.S. patent application Ser. No. 17/160,221, filed Jan. 27, 2021, which claims the benefit of U.S. Provisional Application No. 62/967,011, filed Jan. 28, 2020, all of which are hereby incorporated by reference in their entireties.

FIELD

The present specification relates generally to locomotive equipment, and more particularly to locomotive rehabilitation, therapy, and training equipment.

BACKGROUND

Locomotion is a basic facet of human life. Mobility can, however, be difficult, injurious, or impossible for some. There are a variety of reasons for why a person may experience partial or complete mobility limitations: orthopedic conditions, neurological disorders, motor deconditioning, accident, injury, disease, and disability, for example. Continuing to move—or even attempting to move—can cause discomfort or injury.

Others may be injured or overweight but require exercise to become healthier. Some rehabilitation facilities have elaborate systems to partially support the weight of such patients, so that they may exercise toward health. The patients wear harnesses that are tethered to trolleys which ride in tracks in the ceiling. Such systems are complex, require assistance from a physical therapist, and are very expensive and thus limited in availability to the patient. Some of these systems provide a lifting force by spring, which changes as the user moves and displaces the spring. Others have sophisticated sensing technology which monitors movement of the patient and then adjusts the lifting force so as to provide a constant unweighting of the patient.

In some cases, movement may be possible and, indeed, easy, but the individual nonetheless wishes to lower his risk of injury from such movement. Athletes, for instance, often have a need to train long hours with great intensity. They balance the benefits of high-volume training against the elevated risk of injury. A competitive athlete can, after all, suffer serious physical and mental setbacks from even a mild injury. There are a variety of assistive devices to reduce the likelihood of injury during exercise. For example, runners may use buoyancy devices and run in the water. Or they may run on treadmills while zipped into a pressurized bag that lifts them slightly off the treadmill deck, thereby reducing foot-strike impact.

Still other people do not require assistance reducing their effective bodyweight but do need help with posture and/or stabilization. For them, leaning or tilting beyond the line of gravity can create a dangerous loss of balance.

Physical therapists often have other devices which suspend from above to support the user while he or she moves. For example, devices exist which can be placed over or above a treadmill, usually with harnesses, hooks, or special clothing that partially lifts the patient while walking or running on a treadmill. These devices apply an upward force on a patient to reduce his impact while moving.

Of course, all of these solutions lack freedom of movement. The user is confined to a pool, a treadmill, or a pre-defined path set in ceiling tracks. The person cannot use any of these to walk to the bathroom or around the neighborhood, for example.

Further, and more seriously, each alters the normal pattern of motion during walking and running. Harnesses that hang from the ceiling tracks generally support the user at a single location, usually above the head or near the center of the back. Occasionally they lift the user at opposed sides of the hips. In both arrangements, the harness restricts the normal movement of the upper body during locomotion. The user may experience upward lift on one side of his body that is the same as that on the other side of this body. In other words, the user's left and right sides are lifted equally and simultaneously. In normal walking and running, however, the forces along the left side of the body are different than and independent from those along the right side of the body. Such systems do not account for these differences, and may exercise different muscles than those used in normal running and walking, thereby leading to improper or prolonged rehabilitation, therapy, or training.

Moreover, these systems may exercise different muscles than those used in normal walking and running, thereby leading to improper or prolonged rehabilitation, therapy, or training. The use of these devices in rehabilitation, therapy, or training fails to mimic real-life movement and may lead to improper recovery. An improved solution is needed.

SUMMARY

In an embodiment, a bodyweight unloading locomotive device includes a frame mounted on wheels for locomotive movement. The frame has opposed left and right sides, and a harness supports a user between those left and right sides. An unloading assembly is carried on each of the left and right sides, wherein the unloading assemblies each includes a sprung arm having a fixed end fixed to the respective left and right side, and an opposed free end. The assemblies further each include a cam assembly mounted on the free end of the sprung arm and a tether routed through the cam assembly and extending to the harness. Each of the unloading assemblies thereby exerts an independent unloading force on the harness with respect to the frame, encouraging natural movement and allowing independent unloading of the left and right sides of the body during such natural movement.

In another embodiment, a bodyweight unloading locomotive device includes a frame for supporting locomotive movement. The frame has opposed left and right sides, and a harness supports a user between those left and right sides. An unloading assembly is carried on each of the left and right sides. The unloading assemblies each include a spring having a first end fixed to the respective left and right side, and an opposed second end, a cam assembly, and a tether routed through the cam assembly and extending to the harness. A cable is routed through the cam assembly and extends to one of an anchor on the frame and the second end of the spring. Each of the unloading assemblies exerts an independent unloading force on the harness with respect to the frame.

In yet another embodiment, a bodyweight unloading locomotive device includes a frame configured to support locomotive movement, and an unloading assembly carried by the frame. The unloading assembly includes a spring having a fixed end coupled to the frame and an opposed free end, a cam assembly mounted to the frame for rotational movement, a first tether extending from the free end of the spring to the cam assembly, and a second tether extending from the cam assembly to a load. The unloading assembly exerts an unloading force on the load with respect to the frame.

In still another embodiment, a bodyweight stabilizing unloading locomotive device includes a frame configured to support locomotive movement and a stabilizing unloading assembly carried by the frame. The stabilizing unloading assembly includes a first spring assembly with a first spring constant, a second spring assembly with a second spring constant different from the first spring constant, and a third spring assembly with a third spring constant different from the first and second spring constants. At least one of the first, second, and third spring assemblies includes a lockout means which prevents extension of the one of the first, second, and third spring assemblies beyond a maximum extension.

In yet still another embodiment, a bodyweight stabilizing unloading locomotive device includes a frame configured to support locomotive movement and a stabilizing unloading assembly carried by the frame. The stabilizing unloading assembly includes a first spring assembly with a first spring constant, a second spring assembly with a second spring constant different from the first spring constant, and a third spring assembly with a third spring constant different from the first and second spring constants. At least two of the first, second, and third spring assemblies are arranged in series. At least one of the first, second, and third spring assemblies comprises an extension spring, a first cable extending from a first end of the extension spring and having a first cable loop, and a second cable extending from a second end of the extension spring and having a second cable loop, wherein the first and second cable loops are interconnected.

In another embodiment, a bodyweight stabilizing unloading locomotive device includes a frame configured to support locomotive movement and a stabilizing unloading assembly carried by the frame. The stabilizing unloading assembly includes a first spring assembly with a first spring constant and a first lockout means which prevents extension of the first spring assembly beyond a first maximum extension, a second spring assembly with a second spring constant different from the first spring constant and a second lockout means which prevents extension of the second spring assembly beyond a second maximum extension, and a third spring assembly with a third spring constant different from the first and second spring constants.

The above provides the reader with a very brief summary of some embodiments described below. Simplifications and omissions are made, and the summary is not intended to limit or define in any way the disclosure. Rather, this brief summary merely introduces the reader to some aspects of some embodiments in preparation for the detailed description that follows.

BRIEF DESCRIPTION OF THE DRAWINGS

Referring to the drawings.

DETAILED DESCRIPTION

Figure 1:
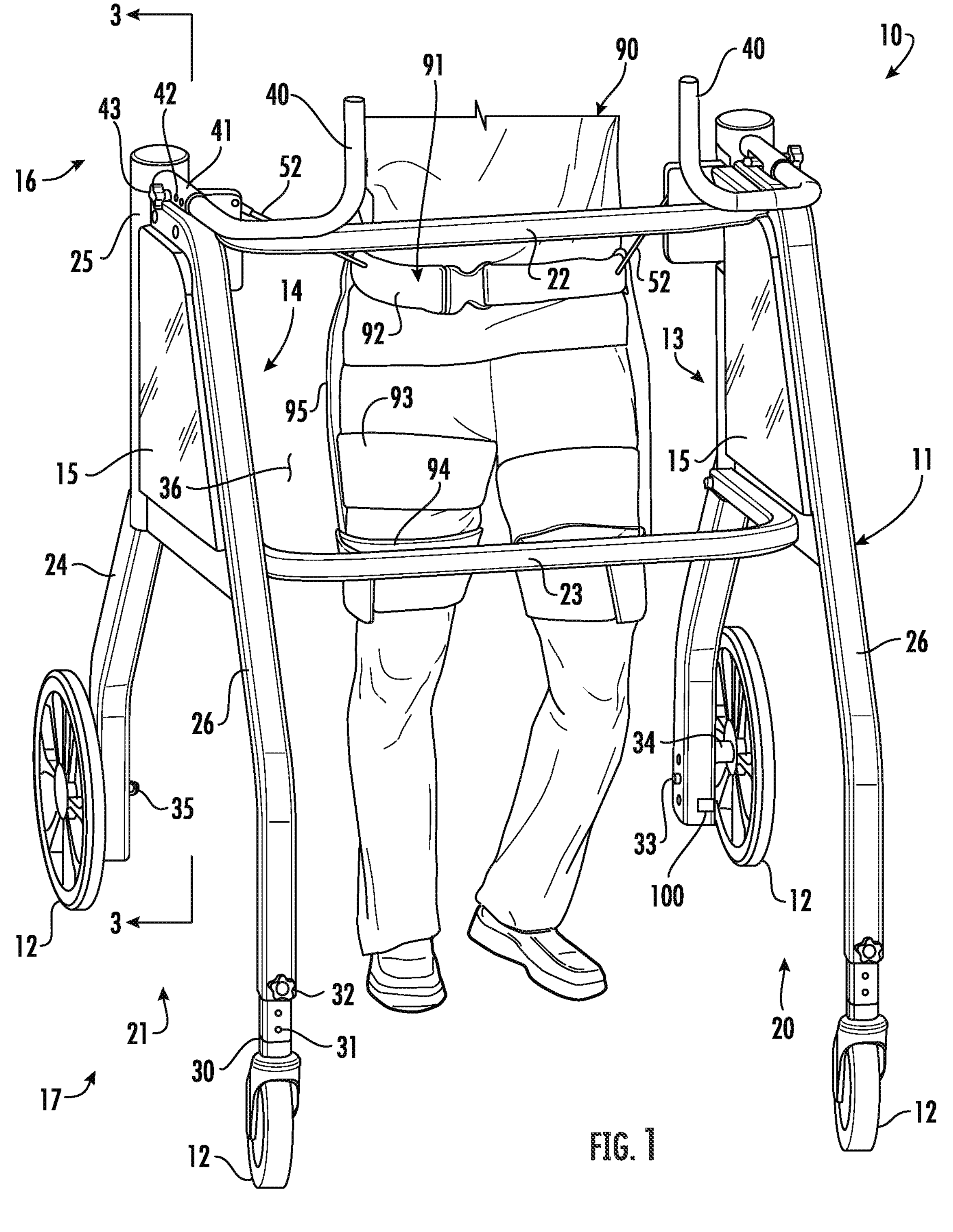
FIGS. 1 and 2 are front perspective and side elevation views of a bodyweight unloading locomotive device, respectively.

Reference now is made to the drawings, in which the same reference characters are used throughout the different figures to designate the same elements. Briefly, the embodiments presented herein are preferred exemplary embodiments and are not intended to limit the scope, applicability, or configuration of all possible embodiments, but rather to provide an enabling description for all possible embodiments within the scope and spirit of the specification. Description of these preferred embodiments is generally made with the use of verbs such as “is” and “are” rather than “may,” “could,” “includes,” “comprises,” and the like, because the description is made with reference to the drawings presented. One having ordinary skill in the art will understand that changes may be made in the structure, arrangement, number, and function of elements and features without departing from the scope and spirit of the specification. Further, the description may omit certain information which is readily known to one having ordinary skill in the art to prevent crowding the description with detail which is not necessary for enablement. Indeed, the diction used herein is meant to be readable and informational rather than to delineate and limit the specification; therefore, the scope and spirit of the specification should not be limited by the following description and its language choices.

Figure 2:
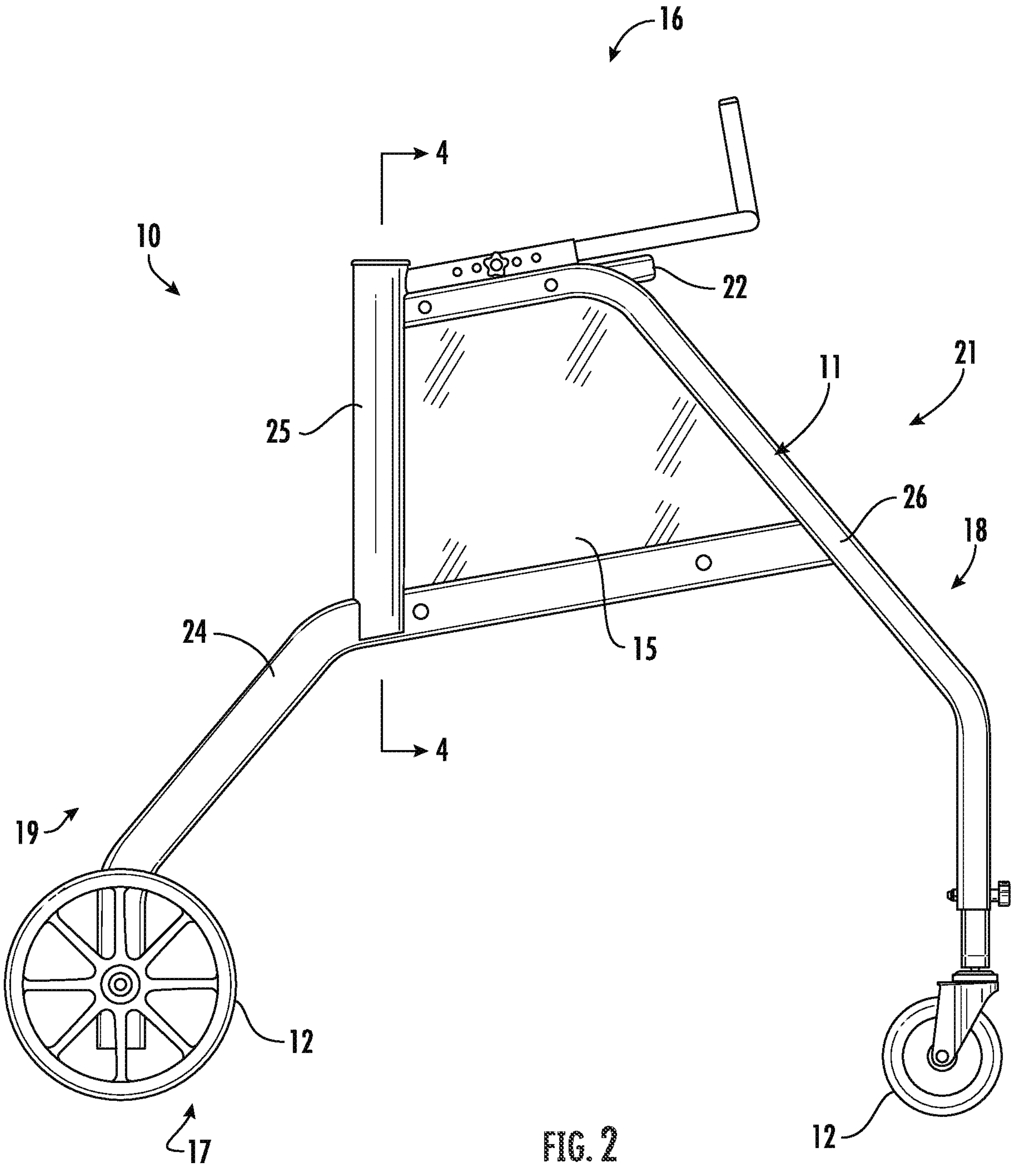

FIGS. 1 and 2 are front perspective and right side elevation views of a bodyweight unloading locomotive device 10 (hereinafter, the “device 10”) for support during movement, regardless of different and independent movements on both sides of the body. The device 10 provides independent, bilateral support proximate the hips of a user, to assist the user in self-propelled, locomotive motion. The device 10 includes an assembled frame 11, four wheels 12, and unloading assemblies 13 and 14 carried on the frame 11. The unloading assemblies 13 and 14 are hidden in FIGS. 1 and 2 by panels 15 carried on the frame 11, but are much more visible in FIGS. 3A and 3B. The unloading assemblies 13 and 14 are coupled to a harness worn by a user, as depicted in FIG. 1, and operate to lift or unload some portion of the user’s bodyweight on the left and right sides of the user’s body.

The device 10 generally has a top 16, an opposed bottom 17, a front 18, and an opposed back 19. The word "generally" is used here to indicate a general area of the device 10, rather than a specific point, element, feature, or the like. Further, description herein may be made to relative directions or orientations with respect to these terms top, bottom, front, back, and the description may indicate the arrangement of multiple elements or features with respect to each other in the context of above, below, in front of, behind, or the like, relying on the reader's understanding of the top 16, bottom 17, front 18, and back 19 for contextual reference.

The frame 11 includes identical left and right sides 20 and 21 rigidly coupled to each other with a top tube 22 and a bottom tube 23. Because the left and right sides 20 and 21 of the frame 11 are identical, only one is described here, with the understanding that the description applies equally to the other. The same reference characters are used for the structural elements and features of both the left and right sides 20 and 21, and the reader will understand that the context or diction of the relevant description will convey whether the description is of the left or right side 20 or 21.

The right side 21 includes a main tube 24 extending generally diagonally from the bottom 17 and back 19 of the device 10 to the bottom tube 23 of the frame 11 proximate the front 18, approximately midway between the top 16 and bottom 17 of the device 10. The main tube 24 has a rectangular cross-section, is hollow, and has a thin, strong, durable, but lightweight sidewall constructed out of a material or combination of materials having those properties, such as steel, aluminum, titanium, or carbon fiber. Other suitable constructive materials and cross-sections are included within the scope of this description.

The main tube 24 is coupled to a vertical tube or housing 25 which rises from the main tube 24 near the back 19 of the device 10. Though the housing 25 is cylindrical, it is also hollow like the main tube 24. The housing 25 holds part of the unloading assembly, as described later.

A front tube 26 extends diagonally downward, opposite the main tube 24. The front tube 26 has an upper section which is nearly, but not quite, level, a long middle section which is diagonal, and a lower section which is nearly vertical. The top back of the front tube 26 is coupled to the top of the housing 25, and the middle of the front tube 26 is coupled to the front of the main tube 24. The front tube 26, like the main tube 24, preferably but not necessarily has a rectangular cross-section, is hollow, and has a thin, strong, durable, but lightweight sidewall constructed out of a material or combination of materials having those properties, such as steel, aluminum, titanium, or carbon fiber.

The bottoms of the main tube 24 and the front tube 26 are generally vertical. The bottom of the front tube 26 is open so as to receive a post 30. The wheels 12 are mounted on the post 30 for rolling movement and for swiveling movement so that the device 10 can be pointed and moved in a desired direction. A series of vertically spaced-apart holes 31 are formed in the post 30, and an adjustment knob 32 is threaded through the bottom of the front tube 26 and into one of the many holes 31. The knob 32 allows vertical adjustment of the post 30 to change the height of the device 10 at the front 18; the knob 32 may be loosened or released from front tube 26, the post 30 slid up or down, and the knob 32 then tightened or re-engaged with the front tube 26.

The bottom of the main tube 24 has a series of vertically spaced-apart holes 33 formed therethrough; these holes 33 receive an axle 34 of each of the wheels 12 at the back 19 of the device 10. The axle 34 can be moved into any of the holes 33 to adjust the height of the device 10 at the back 19. The axle 34 is secured with a pin 35, such as a cotter pin or other suitable engagement, placed through the axle 34 on the opposite side of the main tube 24 from the wheel 12. The wheels 12 in the back 19 preferably, but not necessarily, are mounted for rolling movement but not for swiveling movement.

The left and right sides 20 and 21 of the frame 11 are coupled by the top tube 22 and the bottom tube 23. The top tube 22 is a rigid tube bent into a U shape, with a straight front section and two side sections or legs oriented at roughly ninety degrees to the front section. These legs are screwed, bolted, welded, or otherwise securely engaged to the top sections of the front tubes 26 on both the left and right sides 20 and 21. Similarly, the bottom tube 23 is a rigid tube bent into a U shape, with a straight front section and two side sections or legs oriented at roughly ninety degrees to the front section. These legs are screwed, bolted, welded, or otherwise securely engaged to top sections of the main tubes 24 on both the left and right sides 20 and 21.

When the user uses the device 10, the user stands, walks, or runs behind the top and bottom tubes 22 and 23 and between the left and right sides 20 and 21, as shown in FIG. 1. As such, the top tube 22, together with the left and right sides 20 and 21 and the bottom tube 23, defines a user-receiving area 36 accessible from the back 19 of the device 10.

A handlebar 40 extends forwardly at the top 16 of the device 10. A cylindrical sleeve 41 is mounted along the top section of the front tube 26; the sleeve 41 is hollow, its back is secured against the top of the housing 25, and its front is open. A series of horizontally spaced-apart holes 42 are formed through the outside of the sleeve 41; an adjustment knob 43 is threaded through the holes 42 and allows horizontal adjustment of the handlebar 40 to change the reach of the user when using the device 10. The knob 43 may be loosened or released from sleeve 41, the handlebar 40 slid into or out of it, and the knob 43 then tightened or re-engaged with the sleeve 41.

The handlebar 40 is curved in several different directions. The back of the handlebar 40 is straight so that it may fit in the sleeve 41. The handlebar 40 has a length, as shown in FIG. 1, so that it extends forwardly beyond the top section of the front tube 26. The handlebar 40 then bends inwardly for a short section, and then bends upwardly for a short section. Other handlebar 40 configurations are suitable as well.

The handlebar 40 is hollow and has a thin, strong, durable, but lightweight sidewall constructed out of a material or combination of materials having those properties, such as steel, aluminum, titanium, or carbon fiber. When a user is disposed in the user-receiving area 36 and operating the device 10, the user can easily reach out and hold the handlebar 40, gripping any portion thereof as is comfortable to steady the device 10 and assist in movement and steering.

Figure 3A:
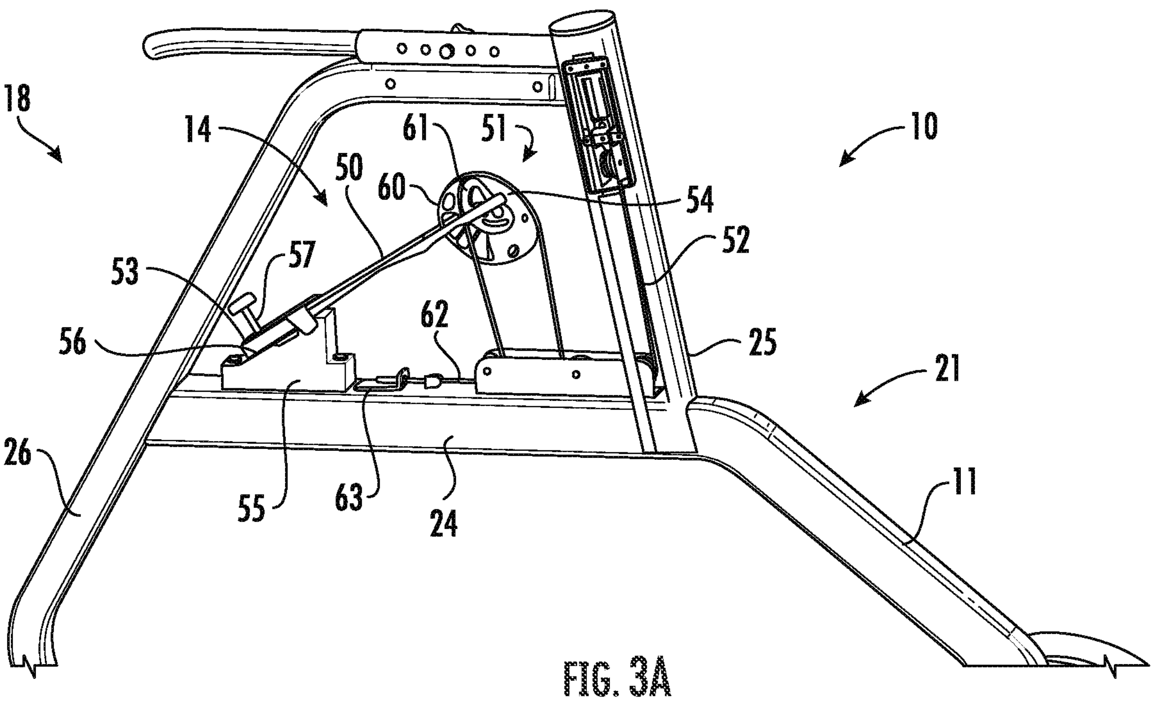
FIG. 3A is an enlarged side elevation view of the bodyweight unloading locomotive device with a panel removed to expose an unloading assembly carried thereon.
Figure 3B:
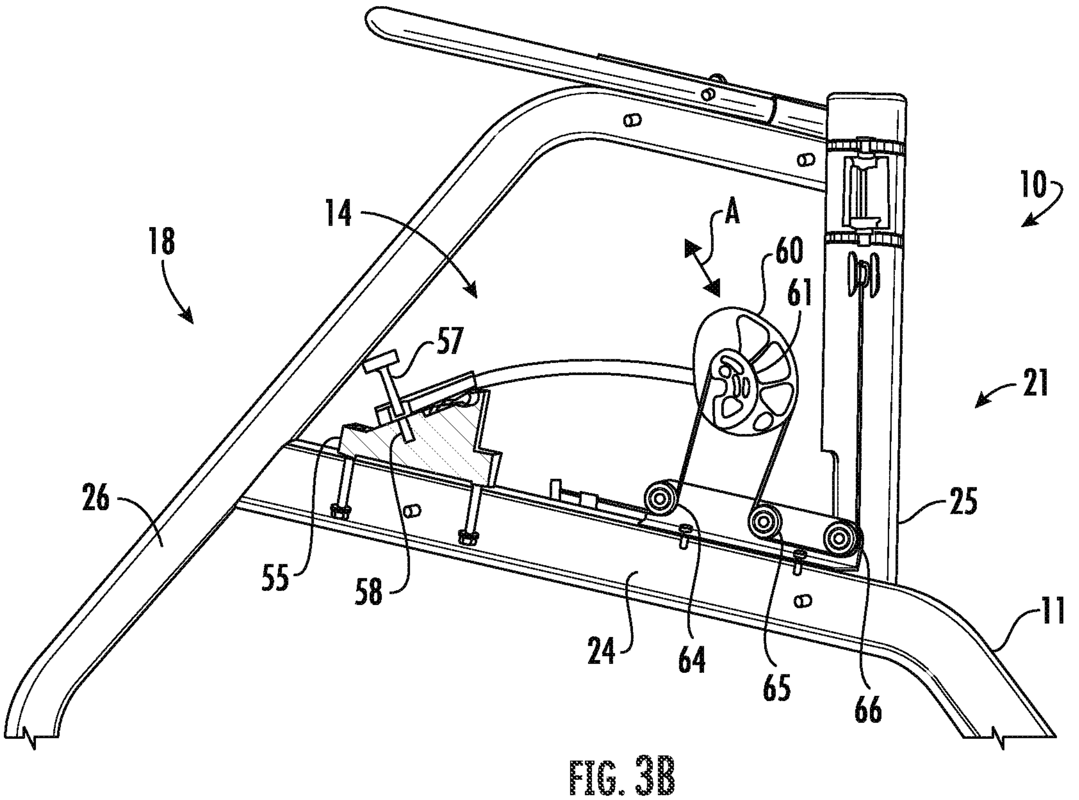
FIG. 3B is a section view taken along the line 3-3 in FIG. 1, slightly sectioning the bodyweight unloading locomotive device and the unloading assembly carried thereon.

FIGS. 3A and 3B show the right side 21 of the frame 11. In FIG. 3A, the panel 15 is removed so that the unloading assembly 14 is visible; FIG. 3B is a section view taken along the line 3-3 of FIG. 1, just barely inside the frame 11, such that the panel 15 is not visible and the frame 11 is partially sectioned. The unloading assemblies 13 and 14 are carried on, and partially within, the frame 11; the unloading assembly 13 is on the left side 20, and the unloading assembly 14 is on the right side 21. Again, as above with respect to the left and right sides 20 and 21, because the unloading assemblies 13 and 14 shown here are identical, only the unloading assembly 14 on the right side 21 will be described here with the understanding that the description applies equally to the other. The same reference characters are applicable to the unloading assembly 14 on the left side 20. However, it should be understood that the unloading assemblies 13 and 14 need not be identical, and this description should not be limited so. Indeed, in some embodiments, it may be desirable to actually have different unloading assemblies. For example, where a user suffers from an asymmetrical weakness, the device 10 may be outfitted with intentionally different unloading assemblies 13 and 14 having different bend, load, and other performance characteristics. For example, for a patient recovering from a stroke, it may be advantageous to provide more unloading force to a side of the patient's body which has been more severely affected by the stroke, while providing less unloading force to the other side. Nevertheless, for the purposes of the description as it relates to the drawings, these particular unloading assemblies 13 and 14 are identical.

The unloading assembly 14 includes a flat spring 50, a stacked cam assembly 51 on the flat spring 50, a cable or tether 52 routed through the stacked cam assembly 51 and a series of pulleys mounted on the frame 11.

The flat spring 50 is a sprung arm: a lightweight, compact, resilient and elongate flat spring member having a first, fixed end 53 and a second, a free end 54. The fixed end 53 is secured in a sleeve mounted on a block 55 having an angled surface 56. An adjustment knob 57 passes through a hole in the fixed end and into a threaded bore 58 in the block 55. The adjustment knob 57 is thus threadably engaged to the block 55 and can be tightened and loosened to change the spring force of the flat spring 50. For less spring force, the adjustment knob 57 is loosened and backed out of the bore 58, which allows the fixed end 53 to rise slightly away from the angled surface 56 of the block 55. For more spring force, the adjustment knob 57 is tightened into the bore 58, which holds the fixed end 53 closer to the angled surface 56 of the block 55. The adjustment knob 57 is a means for adjusting the spring force of the flat spring 50; in other embodiments, the adjustment knob 57 may be an electric, electromechanical or electromagnetic adjustment, or an adjustable bolt, or some other means for changing the spring force.

Indeed, the flat spring 50 operates as a spring. It is mounted in a horizontal configuration. In this horizontal configuration, the free end 54 is above and behind the fixed end 53, and it moves between a first, "unloaded" position as shown in FIG. 3A, in which the free end 54 is in a high position above the fixed end 53, and second, loaded position as shown in FIG. 3B, in which the free end 54 is in a low position closer to the main tube 24. This movement is indicated by the arcuate double-arrowed line A in FIG. 3B. It moves toward the loaded position in response to a weight being placed on the harness on the right side 21, such as by the user walking, and pulling the flat spring 50 down via the tether 52. In response, the flat spring 50 exerts a biasing force in a direction opposite the pull of gravity and vertical translation of the body downward during locomotion; the flat spring 50 acts to pull the tether 52 back. Other horizontal configurations are possible and may be suitable, including configurations which are vertically or horizontally flipped with respect to the above-described configuration. Generally, however, the horizontal configuration is defined as one in which the spring (the spring arm 50, in this case) extends horizontally.

In this way, the flat spring 50 is just a spring which exerts a biasing force in opposition to displacement: extension or compression of a spring. And, in this sense, other springs may be suitable, such as coil springs, pneumatic springs, torsion springs, etc. The flat spring 50 has a non-linear force-displacement curve, such that the force required to displace the flat spring 50 increases as the displacement increases; at larger displacements, a larger force is necessary to displace the free end 54 by the same amount. The flat spring 50 produces a biasing force against its curve, toward the front 18 of the device 10. As such, when the user is moving forward, this forward bias assists in moving the device 10 forward as well.

The stacked cam assembly 51 is mounted for rotation on the free end 54. The stacked cam assembly 51 includes outer and inner cams 60 and 61, placed side-by-side on the free end 54. Both cams 60 and 61 are mounted for rotation with respect to each other about the same axis of rotation, however, the cams 60 and 61 are fixed to each other to prevent relative rotation.

The outer cam 60 is larger, and the inner cam 61 is smaller. Both cams 60 and 61 are eccentrics with different profiles or shapes; their axes of rotation are offset from their respective geometric centers, such that as they rotate, their lever arms change and the ratio of their respective lever arms change. In this way, with the tether 52 wrapped around the outer cam 61 and the tether 62 wrapped around the inner cam 60, in grooves formed therein, the flat spring 50 and cam assembly 51 together form a constant-force displacement system. In other words, beyond a pre-determined pre-loaded displacement, additional displacement does not significantly change the force required for continued displacement. This is described in greater detail below. Further, in other embodiments of the device 10, different cam combinations are used, including assemblies with three or more cams, cams of different sizes than presented here, similarly-sized cams, etc. It is noted here that the word "cam" includes a rotating wheel and an eccentrically-mounted wheel or eccentric wheel. A cam is a mechanical element that converts rotational and translational movement. In the scope of this description, a cam is a wheel, pulley, or other rotating element which is preferably but not necessarily mounted eccentrically. Eccentric rotation is rotation of an element about an axis which is offset from the geometric center of the element. Thus, the shape or profile of the outer perimeter of the element may define it as a cam, or the location of the axis of rotation may define the element as a cam. All of these definitions are considered within the scope of this disclosure, without exclusion, for all embodiments described herein.

Another tether, an inelastic anchor cable 62, is tied between the inner cam 61 and a tie-down 63. This anchor cable 62 is part of the unloading assembly 14. The tie-down 63 is an anchor preventing the end of the anchor cable 62 attached thereto from moving; the other end of the anchor cable 62 is fixed to the inner cam 61. Mounted on top of the main tube 24 is a pulley assembly including three pulleys 64, 65, and 66. One end of the anchor cable 62 is fixed to the top of the front of the inner cam 61 and lays in a groove therein before extending down to the pulley 64. With rotation of the inner cam 61, the anchor cable 62 wraps around the circumference of the inner cam 61 and effectively shortens the anchor cable 62, bending the flat spring 50 toward the loaded position. The length of the anchor cable 62 can be adjusted at the tie-down 63 to increase or decrease the pre-load on the flat spring 50.

The tether 52 has an opposite orientation on the larger outer cam 60. It has two ends. One end of the tether 52 is fixed to front side of the cam 60; this end is wrapped over the top of the cam 60 but in a different direction from the anchor cable 62, such that it is fixed to the front side of the cam 60 and then extends over and around the circumference of the cam 60. From there, the tether 52 extends downward to the pulleys 65 and 66. The pulley 66 is partially mounted inside the housing 25. As the tether 52 routes under the pulley 65, it is redirected from a roughly vertical direction to a roughly horizontal one, and as the tether 52 routes under the pulley 66, it is redirected from that roughly horizontal direction to a roughly vertical one inside the hollow housing 25.

The three pulleys 64, 65, and 66 have parallel axes; each spins in the same direction. All three pulleys 64, 65, and 66 are mounted proximate each other, along the main tube 24, and in the same plane, such that they only act to redirect the anchor cable 62 or tether 52 in a new direction along that plane. However, the tether 52 rises up from the pulley 66 inside the housing 25 to a different set of pulleys which orient the tether 52 for attachment to the harness.

Figure 4A:
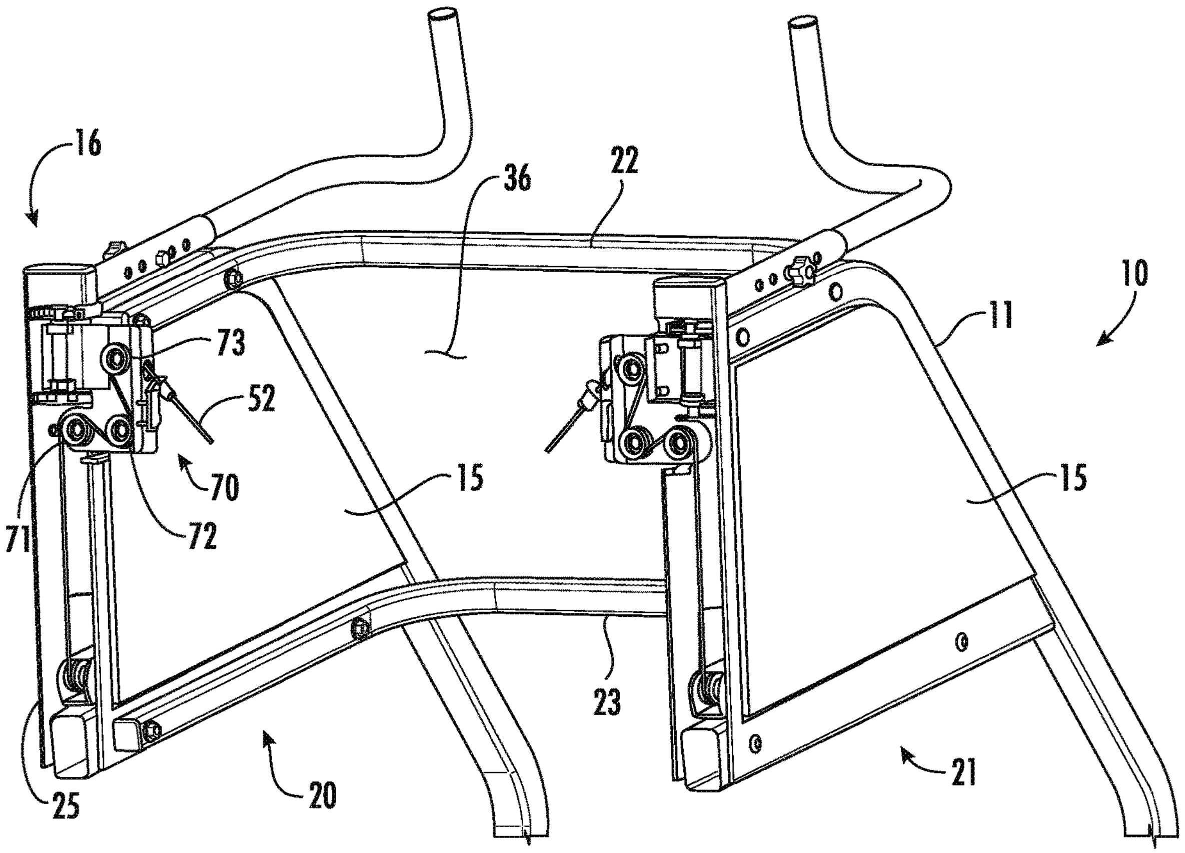
FIG. 4A is a section view taken along the line 4-4 in FIG. 2, showing pulley cassettes on the bodyweight unloading locomotive device.
Figure 4B:
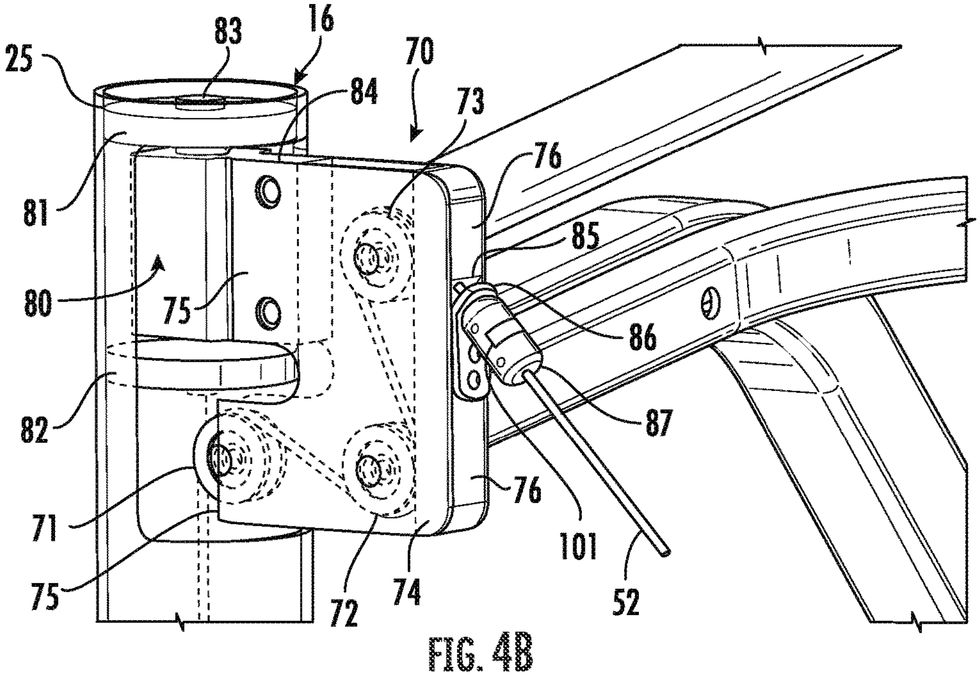
FIGS. 4B and 4C are enlarged rear perspective views of one of the pulley cassettes.
Figure 4C:
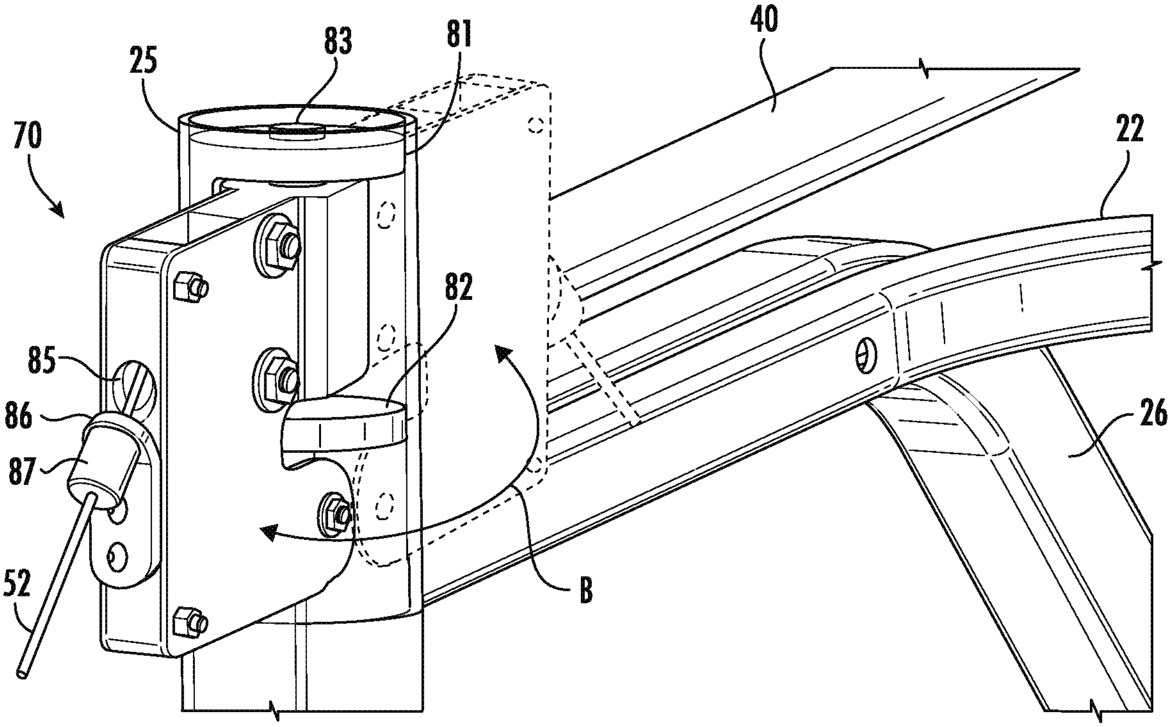

FIGS. 4A-4C illustrate a pulley cassette 70 containing these other pulleys 71, 72, and 73 which redirect the tether 52. The pulley cassette 70 is part of the unloading assembly 13 (or 14) and is mounted for swinging movement in the housing 25 of the frame 11 and includes an outer housing 74 with an inner side 75 and an opposed outer side 76. The outer side 76 is directed away from the frame 11, inward into the user receiving area 36. The inner side 75 is partially carried within the housing 25. Proximate the top 16, the housing 25 has a large open window 80. The pulley cassette 70 swings forward and backward in this window 80. Two discs 81 and 82 are secured within the housing 25; the disc 81 is proximate the top 16, and the disc 82 is just slightly lower. Extending coaxially between the discs 81 and 82 is a pin 83. Fixed to the inner side 75 of the pulley cassette 70 is a leaf with a knuckle 84. The knuckle 84 has a vertical bore which is loosely mounted over the pin 83. Thus, the knuckle 84 pivots on the pin 83, and the pulley cassette 70 swings with the knuckle between a forward position (shown in broken line in FIG. 4C) and a rearward position (shown in solid line) along the double-arrowed arcuate line B in FIG. 4C. FIG. 4C shows a wide range of angular movement, but preferably the pulley cassette is limited in swinging more than thirty degrees in front of or behind a neutral position, which is shown in FIGS. 4A and 4B.

Within the housing 74 are three axles on which the pulleys 71, 72, and 73 are mounted for rolling movement. When the pulley cassette 70 is in the neutral position of FIGS. 4A and 4B, these pulleys 71, 72, and 73 are mounted in a perpendicular offset fashion to the pulleys 64, 65, and 66. The tether 52 extends up from the pulley 66, inside the housing 25, and routes over the first pulley 71, then under the second pulley 72, and then again over the third pulley 73. A hole 85 is formed through the outer side 76 of the housing 74, and a strong bracket mounted outside the hole 85 has a hole corresponding thereto. A stop 87 is secured on the tether 52 to prevent the tether 52 from being pulled into the pulley cassette 70 farther than desired.

In operation, a user uses the device 10 to assist in locomotive movement. The device 10 is useful for physical therapy, rehabilitation, and athletic training. Returning to FIG. 1, a user 90 is illustrated in the user-receiving area 36 using the device 10. The user is wearing a harness 91. Any suitable harness 91 may be used; this harness 91 includes an adjustable waist belt 92, adjustable thigh straps 93, adjustable above-the-knee straps 94, and outer or lateral straps 95 on each side of the harness 91 inelastically connecting the waist belt 92, thigh strap 93, and above-the-knee strap 94. In FIG. 1, the tethers 52 from both unloading assemblies 13 and 14 are shown directly attached to the waist belt 92. Attachment of the tethers 52 to a point at the level of the region between the hip joint and the waist is preferred. In other embodiments, the tethers 52 may terminate with clips such as carabiners for coupling to loops on the waist belt 92. The tethers 52 are attached to opposing sides of the waist belt 92, just above the hip joints. In this way, each tether 52 independently acts on one respective side of the body.

The harness 91 couples the user 90 to the device 10. When the user 90 walks, his hips move up and down. In normal locomotion, when the left leg is moved forward, his left hip rises slightly and his right hip drops slightly, and his pelvis rotates to a small degree. When it does, on the left side 20, the cassette pulley 70 swings forward slightly, the tether 52 retracts (until limited by the stop 87 encountering the bracket 86), and the flat spring 50 bends to a lesser degree toward its unloaded position. The force exerted by the flat spring 50 is in the forward direction, which assists in moving the device 10 forward slightly. At the same time, on the right side 21, the cassette pulley 70 swings backward slightly, and the tether 52 extends to accommodate the dropping of the right hip and rotation of the pelvis. This pulls the tether 52 through the pulley cassette 70 and through the pulleys 64, 65, and 66, thereby causing the cam assembly 51 to rotate and the flat spring 50 to bend to a greater degree. The left and right side 20 and 21 flat springs 50 independently exert a bias on the tethers 52 on their respective sides; in response, the user 90 feels his weight on both the right and left sides of this body at least partially unloaded. Further, because the unloading assemblies 13 and 14 each independently are a constant-force displacement system, rather than a simple spring force or exponential force displacement system, the user 90 experiences a constant or consistent unloading despite the extent of the displacement on either side. In other words, whether the user 90 raises his right hip or drops his right hip a little or a lot, the unloading force he experiences is constant. In yet other words, if the user drops his right hip a significant distance, he does not experience a proportionally greater unloading. For example, the device 10 can be set up to provide a constant fifty pounds of unloading force. If the user drops his hip a little, he will feel that fifty pounds of unloading; if the user drops his hip a lot, he will still feel that same fifty pounds of unloading.

Moreover, the sides of his body move independently—and are allowed to move independently—because the unloading assemblies 13 and 14 are independent of each other. In more detailed operation, when the hip of the user 90 moves a distance, the tether 52 moves this distance as well, and unwinds from the cam 60. The anchor cable 62 spools onto the cam 61, shortening its effective length and causing the flat spring 50 to flex. The cam assembly 51 unreels and the flat spring 50 bends to a greater degree. Because the flat spring 50 and cam assembly 51 combine to form a constant-force displacement, however, the patient feels a constant upward unloading force on that side of the harness 91. The displacement of the tether 52—whether it is one inch or six inches—does not cause a proportional change in the upward force. Rather, the displacement causes essentially no change in unloading force. In this way, the device 10 provides a constant unloading of each side of the user's body, independently of each other.

In other embodiments, a sensor 100 proximate one of the wheels 12 measures rolled distance. A sensor 101 in the stop 87, or in the pulley cassette 70, or somewhere along the tether 52, measures acceleration and thus force, and possibly also angle of incline. The sensors 100 and 101 each may include a microprocessor, gyroscope, accelerometer, memory chip, PCB, and like electronic components. The readings from these two sensors 100 and 101 are correlated for later analytics; doctors and physical therapists can use this information to determine stride length, stance and swing phase duration, speed, work energy, and other kinematic and kinetic parameters of locomotion, and this information can be compared for each side of the body as well as over time to evaluate rehabilitation. Moreover, in some embodiments, these sensors 100 and 101 are coupled in wired or wireless data communication to a display head unit, such as a smartphone or other electronic device, preferably mounted on the top tube 22, which displays such information to the user 90. The user 90 can toggle through this and other information by depressing a physical button or touching the display of the head unit.

In some instances, the wheels of the device 10 may be removed. This removes the mobility of the device 10, but it can instead now be placed on or around a treadmill. The bottom 17 of the frame may be bolted onto or otherwise secured to the treadmill using the holes 31 and 33. Alternatively, pads or cushions applied to the bottom 17 of the frame 11 can support the device 10 around the treadmill. The user can then walk or run on the treadmill with his weight supported as described above.

Figure 5:
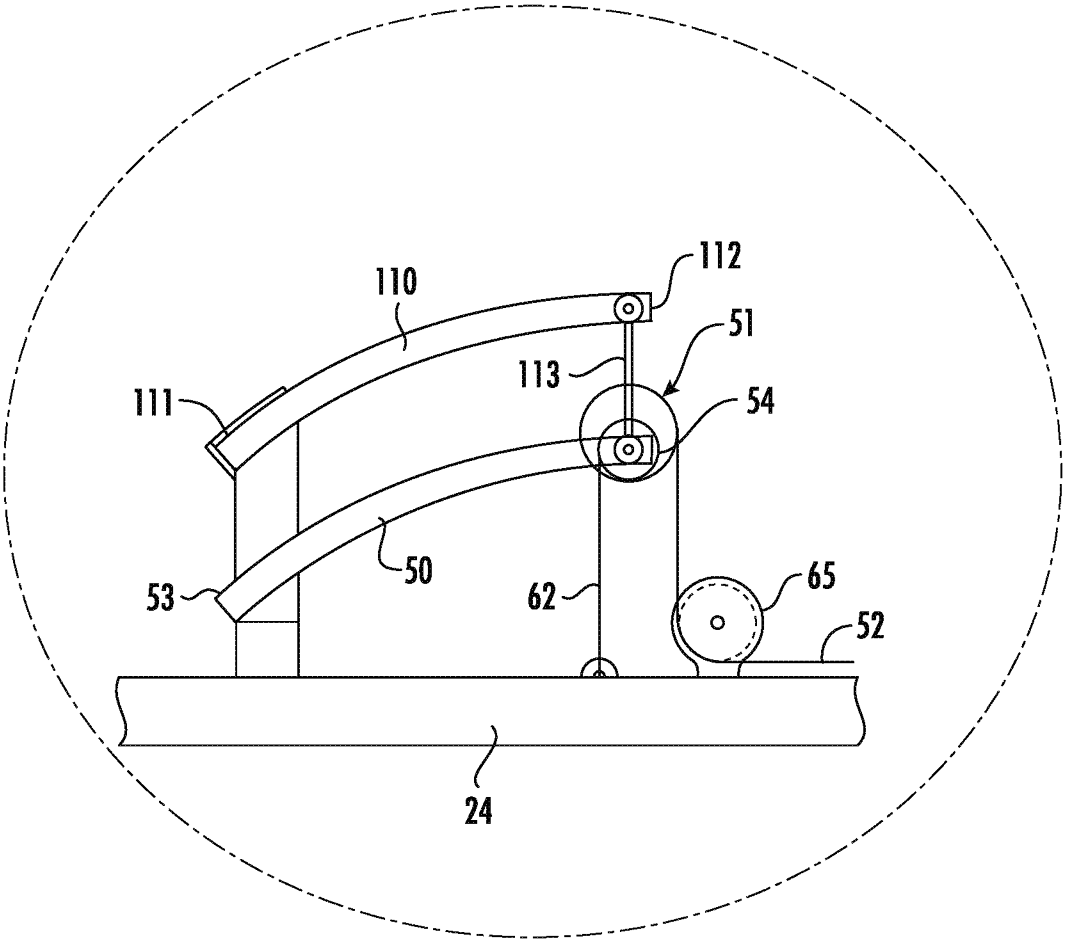
FIGS. 5-7 are enlarged, generalized diagrams illustrating alternative embodiments of the unloading assembly.

FIG. 5 shows an alternate embodiment of the unloading assembly 13 of the device 10. The below description applies equally to an alternate embodiment of the unloading assembly 14. In this embodiment, two flat springs are used in combination. FIG. 5 is stylized in the form of a free body diagram, but a reader understanding the description hereto will nonetheless readily appreciate and understand FIG. 5.

The flat spring 50 is mounted as in FIG. 3A: the fixed end 53 is fixed to the main tube 24 and the free end 54 is free. The cam assembly 51 is mounted for rotation to the free end 54, and the anchor cable 62 is fixed while the tether 52 routes around the pulley 65 to extend to the harness. However, in this embodiment, a second flat spring 110 is used. The flat spring 110 is also a sprung arm preferably, but not necessarily, identical in structure, features, and construction to the flat spring 50; it also includes a fixed end 111 and a free end 112. The flat spring 110 is mounted in a parallel fashion to the flat spring 50. As the term is used here, "parallel" is analogous to two elements in an electrical circuit and does not necessarily refer to a geometric relationship or alignment between the two flat springs 50 and 110. Specifically, the flat spring 50 and cam assembly 51 are in a first position, and the second flat spring 110 is carried in a second position; the first and second positions are different but are registered with each other in a vertically offset fashion. The flat springs 50 and 110 in this embodiment are coextensive, but they need not be.

The second flat spring 110 is stacked above the flat spring 50. A rigid, inelastic cable 113 ties or couples the free end 112 of the flat spring 110 to the free end 54 of the flat spring 50, such that movement of the free end 54 immediately and directly imparts movement to the free end 112. This coupled arrangement increases the spring force of the flat spring 50. The tether 52 remains wrapped around the cam assembly 51 on the flat spring 50. Stacking flat springs on the frame 11 in this way allows the device 10 to unload more weight from the user during operation. In other embodiments, three or more flat springs could be stacked, though this would not likely be necessary for all but the most demanding of weight needs.

Figure 6:
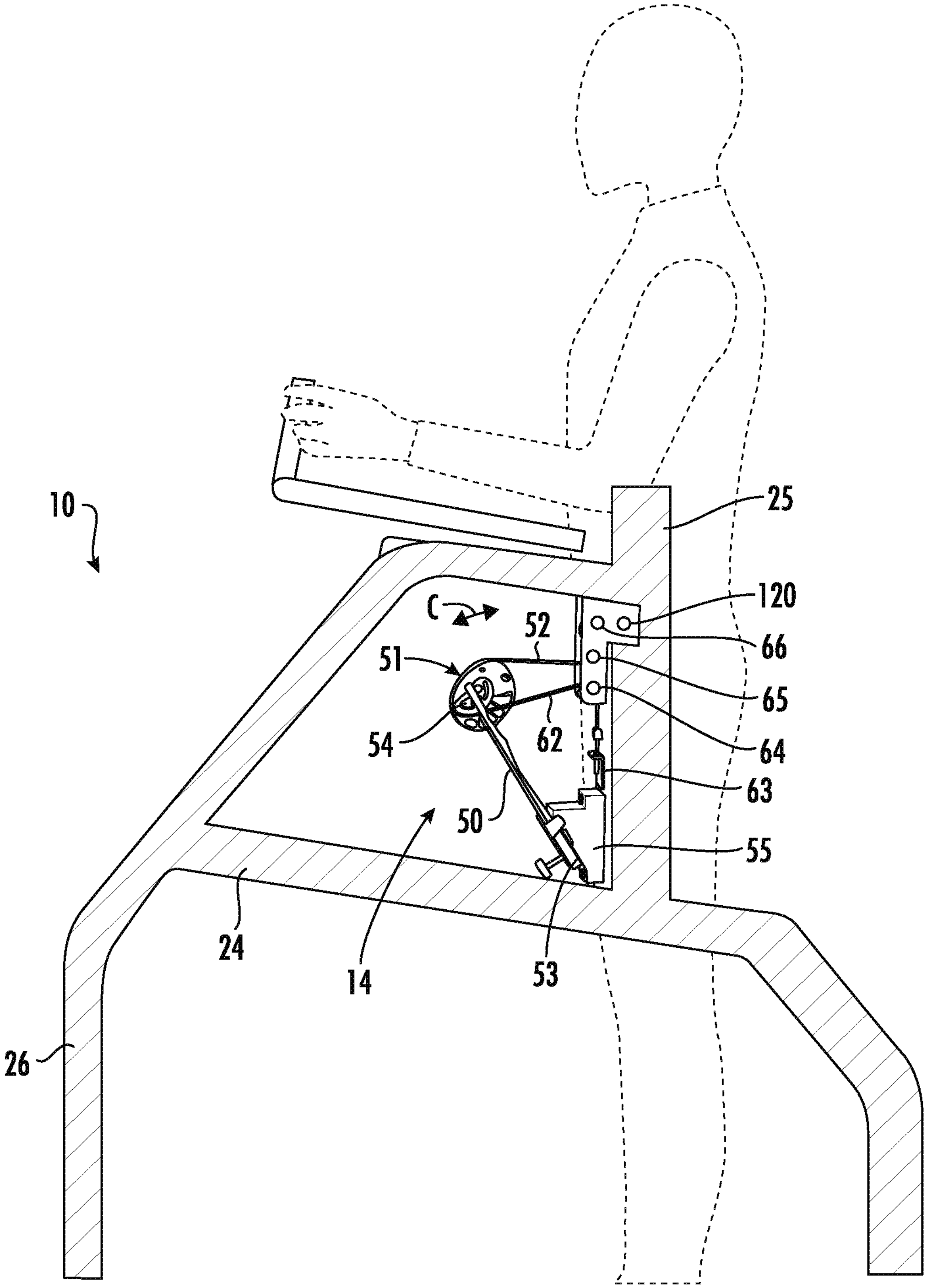

FIG. 6 shows another alternate embodiment of the device 10. While the unloading assembly 14 in FIGS. 3A and 3B is mounted in a horizontal configuration in which the flat spring 50 extends rearwardly in a general direction and its free end 54 is behind its fixed end 53, here in FIG. 6, the unloading assembly 14 is mounted in a vertical configuration. This unloading assembly 14 is mounted on the vertical housing 25 rather than the horizontal top of the main tube 24. The flat spring 50 is still mounted to the block 55, but the block 55 is fixed vertically on the housing 25, such that the flat spring 50 extends upward, rather than rearward. The free end 54 of the flat spring 50 is above the fixed end 53, and when the flat spring 50 flexes, the free end 54 is displaced rearwardly toward the housing 25. The flat spring 50 produces a biasing force against its curve, toward the front 18 of the device 10. As such, when the user is moving forward, this forward bias assists in moving the device 10 forward as well. FIG. 6 shows in solid line the unloading assembly 14 in an unloaded position, and the unloading assembly 14 moves along the double-arrowed arcuate line C toward the housing to a loaded position, similar in displacement to the loaded position shown for the horizontal configuration of FIG. 3B. Other vertical configurations are possible and may be suitable, including configurations which are vertically or horizontally flipped with respect to the above-described configuration. Generally, however, the vertical configuration is defined as one in which the spring (the spring arm 50, in this case) extends vertically. The pulleys 64, 65, and 66 are also moved to a vertical arrangement, but the anchor cable 62 still routes through the pulley 64 and is secured to the tie-down 63, which is on the housing 25. The tether 52 also still routes through the pulleys 65 and 66 but now also extends through an additional pulley 120 which redirects the tether 52 upwardly through the housing to the pulley cassette 70.

Figure 7:
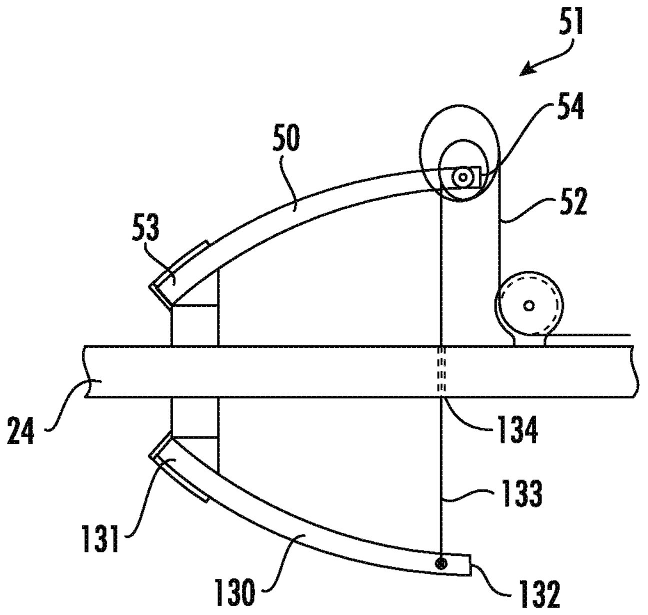

FIG. 7 shows yet another alternate embodiment of the unloading assembly 13 of the device 10, somewhat similar to that shown in FIG. 5. The below description applies equally to an alternate embodiment of the unloading assembly 14. In this embodiment, two flat springs are used in combination. FIG. 7 is stylized in the form of a free body diagram, but a reader understanding the description hereto will readily appreciate and understand FIG. 7.

The flat spring 50 is mounted as in FIG. 3A: the fixed end 53 is fixed to the main tube 24 and the free end 54 is free. The cam assembly 51 is mounted for rotation to the free end 54, and the anchor cable 62 is fixed while the tether 52 routes around the pulley 65 to extend to the harness. However, in this embodiment, a second flat spring 130 is used. The flat spring 130 is also a sprung arm and is preferably, but not necessarily, identical in structure, features, and construction to the flat spring 50; it also includes a fixed end 131 and a free end 132. The flat spring 130 is mounted in a parallel fashion to the flat spring 50, however, it is mounted below the main tube 24, or opposite the flat spring 50. As the term is used here, "parallel" is analogous to two elements in an electrical circuit and does not refer to a geometric relationship or alignment between the two flat springs 50 and 130. Specifically, the flat spring 50 and cam assembly 51 are in a first position, and the second flat spring 130 is carried in a second position; the first and second positions are different but are registered with each other in a vertically offset fashion. The flat springs 50 and 130 in this embodiment are coextensive, but they need not be.

The second flat spring 130 is stacked below the flat spring 50 and has an inverted position: while the flat spring 50 flexes downwardly under a load, the second flat spring 130 flexes upwardly. An inelastic cable 133 couples the free end 132 of the flat spring 130 to the inner cam 61 at the free end 54 of the flat spring 50, such that rotation of the inner cam 61 directly imparts upward movement of the free end 132 of the flat spring 130 as well as downward movement of the free end 54 of the flat spring 50. The cable 133 passes through a bore 134 in the main tube 24. This coupled arrangement increases the spring force of the unloading assembly beyond that of the unloading assembly 13 or 14. The tether 52 remains wrapped around the outer cam 60 of the cam assembly 51 on the flat spring 50. Coupling flat springs on the frame 11 in this way allows the device 10 to unload more weight from the user during operation. In other embodiments, three or more flat springs could be stacked on either side of the main tube 24 and coupled together, though this would not likely be necessary in all but the most demanding of weight needs.

In some embodiments, the cam assembly 51 need not be mounted directly onto the flat spring 50, or, in other words, the cam assembly 51 can be separate from the spring. For example, the flat spring 50 of FIG. 7 could be modified to be a rigid, inflexible, unyielding arm 50. In this embodiment, the cam assembly 51 is simply mounted to an arm 50, similar to a rigid post, above the main tube 24. The arm 50 is thus simply considered part of the frame 11, or a rigid extension thereof. The cam assembly 51 is thus coupled to the second or free end 132 of the bendable flat spring 130 with the inelastic cable 133, and to the harness with the tether 52. The flat spring 130 is the only arm that moves in this arrangement; when the harness drops, the tether 52 pulls on and rotates the cam assembly 51, and the cable between the cam assembly 51 and the flat spring 130 pulls on and bends the flat spring 130. This embodiment is exemplary of unloading assemblies in which the cam assembly and the flat spring are separate, illustrating that the cam assembly need not be carried on or mounted to the flat spring. Indeed, the unloading assembly still operates effectively as a constant-force displacement system when the cable 133 (or anchor cable 62) couples the cam assembly in one direction to a spring (such as the flat spring 130) and the tether 52 couples the cam assembly in an opposing direction to the harness, regardless of the mounting of the cam assembly on or off the spring. This alternate version of FIG. 7 describes such an arrangement in an exemplary fashion. In other embodiments, the spring arm and cam assembly may be separated and not mounted to each other, and the arrangement of the cam assembly and spring arm are actually reversed: the cam assembly 51 is mounted on the main tube 24, the spring arm 50 is mounted on the main tube 24 apart from the cam assembly 51 extends away, an anchor cable 62 coupled to a tie-down 63 extends to the cam assembly 51, and then a tether 52 extends from the cam assembly 51 to over the free end 54 of the flat spring 50 and then toward the harness (likely through a pulley assembly).

Figure 8:
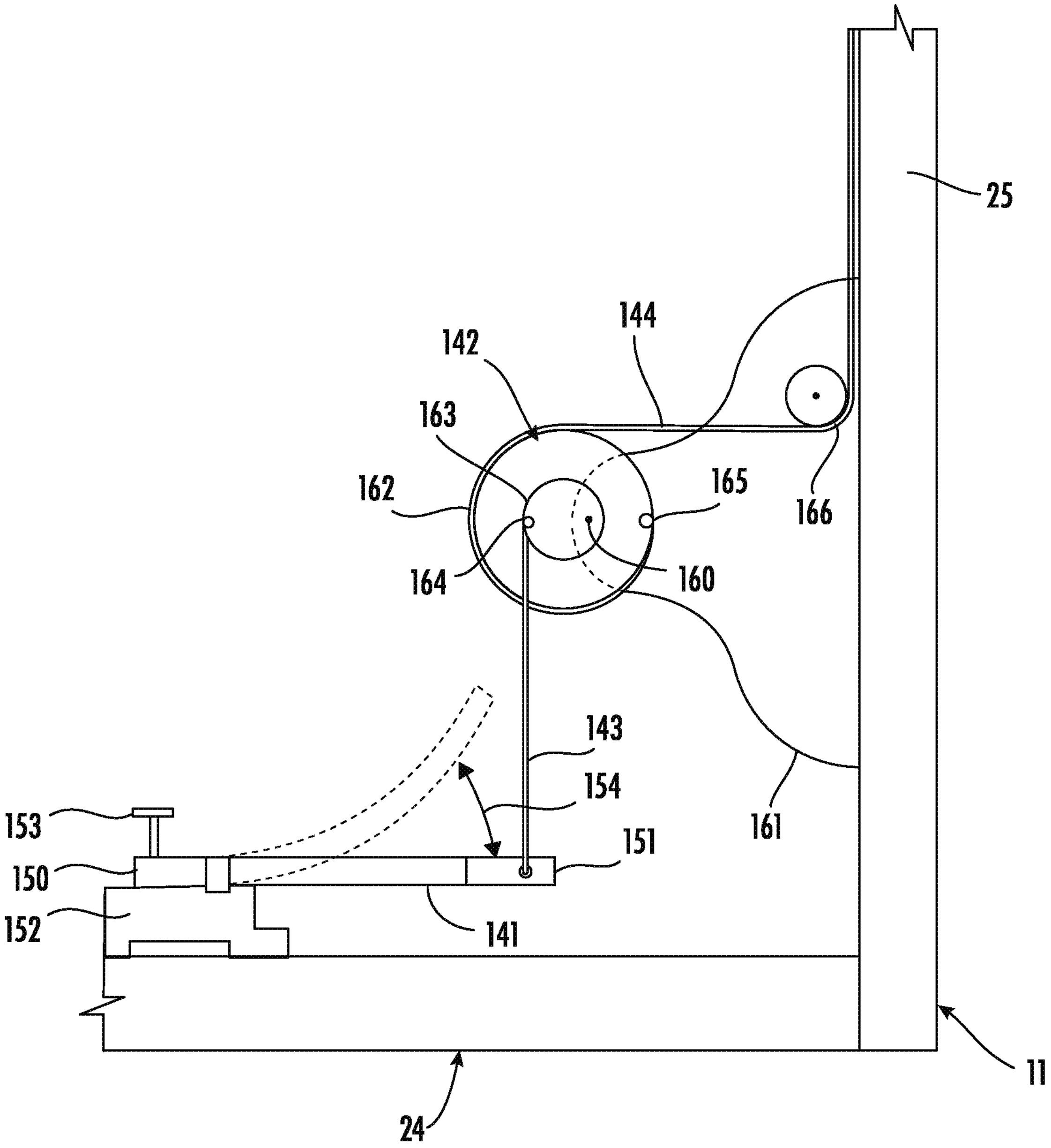
FIGS. 8-10B are enlarged, generalized diagrams illustrating alternative embodiments of the unloading assembly.

FIGS. 8-10B illustrate other alternate embodiments of unloading assemblies suitable for use with the device 10. The below descriptions apply equally to an unloading assembly used on the left or right sides 20 of the frame 21 or in an alternate location to support the user within the device 10. FIG. 8 illustrates a stylized, free-body diagram of an unloading assembly 140 but nevertheless shows the structural elements and features of the assembly 140. The unloading assembly 140 is positioned within the frame 11 proximate the main tube 24 and the vertical tube or housing 25.

The unloading assembly 140 includes a flat spring 141, a cam assembly 142, a first tether 143 extending from the flat spring 141 to the cam assembly 142, and a second tether 144 extending from the cam assembly 142 and running up (or in some cases, inside) the housing 25 to the pulley cassette 70 described above. As described, the unloading assembly 140 exerts an unloading force on the harness 91 and a load carried therein with respect to the frame 11, in response to the load being applied at the harness 91.

The flat spring 141 is a sprung arm: a lightweight, compact, resilient and elongate flat spring member having a first, fixed end 150 and a second, free end 151. The fixed end 150 is secured in a sleeve mounted on a block 152. An adjustment knob 153 passes through a hole in the fixed end 150 and into a threaded bore in the block 152. The adjustment knob 153 is thus threadably engaged to the block 152 and can be tightened and loosened to change the spring force of the flat spring 141. For less spring force, the adjustment knob 153 is loosened and backed out of the bore, which allows the fixed end 150 to rise slightly away from the block 152. For more spring force, the adjustment knob 153 is tightened into the bore, which holds the fixed end 150 closer to the block 152. The adjustment knob 153 is a means for adjusting the spring force of the flat spring 141; in other embodiments, the adjustment knob 153 may be an electric, electromechanical or electromagnetic adjustment, or an adjustable bolt, or some other means for changing the spring force.

The flat spring 141 operates as a spring. It is mounted in a horizontal configuration. In this horizontal configuration, the free end 151 is level with the fixed end 150 and moves between a first, "unloaded" position as shown in solid line in FIG. 8, and a second, "loaded" position as shown in broken line in FIG. 8, in which the free end 151 is in a high position away from the main tube 24 and above the fixed end 150. This movement is indicated by the arcuate double-arrowed line 154.

The flat spring 141 moves toward the loaded position in response to a load being placed in the harness 91, such as by the user 90 walking, and pulling the flat spring 141 up via the second tether 144. Throughout this description, "load" is used to describe any weight or other downward force exerted on the harness 91, and it should be understood as such. A load is preferably a live load, such as a user 90 in the harness, or it may be some other weight or downward force acting on the unloading assembly 140. In response to application of the load, the flat spring 141 exerts a biasing force in a direction opposite the pull of gravity and vertical translation of the user 90 downward during locomotion or elongation of the second tether 144 with lateral translation of the pelvis; the flat spring 141 acts to pull the second tether 144 back. Other horizontal configurations are possible and may be suitable, including configurations which are vertically or horizontally flipped with respect to the above-described configuration. Generally, however, the horizontal configuration is defined as one in which the spring (the spring arm 141, in this case) extends horizontally.

In this way, the flat spring 141 is just a spring which exerts a biasing force in opposition to displacement, whether that is through deflection, extension, or compression of a spring. And, in this sense, other springs may be suitable, such as coil springs, pneumatic springs, torsion springs, etc. The flat spring 141 has a non-constant force-displacement curve, such that the force produced by the flat spring 141 increases as the displacement of the three end 151 increases; at larger displacements, the spring force is larger. The flat spring 141 is directed horizontally toward the housing 25, and the free end 151 terminates below the cam assembly, such that deflection of the flat spring 141 causes the spring 141 to yield and deflect upward toward the cam assembly 142.

The cam assembly 142 is mounted for rotation on an axle 160 carried on a bracket 161. The bracket 161 is secured to the housing 25 and extends forwardly. The cam assembly 142 includes outer and inner cams 162 and 163. The stacked cam assembly 142 includes outer and inner cams 162 and 163, mounted coaxially side-by-side on the bracket 161. Both cams 162 and 163 are mounted for rotation with respect to each other about the same axis of rotation, but the cams 162 and 163 are fixed to each other to prevent relative rotation to each other.

The outer cam 162 is larger, and the inner cam 163 is smaller. Both cams 162 and 163 are circular wheels in this drawing. They are concentric to each other but the axle 160 about which they are mounted is not concentric, and therefore the cams 162 and 163 are mounted for eccentric rotation. In other words, their axes of rotation are offset from their respective geometric centers, such that as they rotate, their lever arms change and the ratio of their respective lever arms change. In other embodiments, the axle 160 is mounted concentrically to the cams 162 and 163, and in other embodiments, the cams 162 and 163 have shapes other than circles.

The first tether 143 is an inelastic cable, band, cord, or other tether. One end of the first tether 143 is coupled to the free end 151 of the flat spring 141, and the other end of the first tether 143 is coupled to the inner cam 163. The inner cam 163 has at least a single groove formed into its perimeter, and as the inner cam 163 rotates, the first tether 143 rolls and unrolls from this groove.

Similarly, the second tether 144 is an inelastic cable, band, cord, or other tether. One end of the second tether 144 is coupled to the outer cam 162. From there, the second tether 144 extends over to and then up the housing 25 and to the pulley cassette 70 and then eventually to the harness 91. Though the pulley cassette 90 and harness 91 are not shown in FIG. 8, the reader will understand their location and arrangement from the description above. The outer cam 162 has at least a single groove formed into its perimeter, and as the outer cam 162 rotates, the second tether 144 rolls and unrolls from this groove.

The first and second tethers 143 and 144 are arranged oppositely to each other on the cam assembly 142. The first tether 143 is secured at an attachment point 164 on the inner cam 163 and extends downward to the flat spring 141. The second tether 144 is secured at an attachment point 165 on the outer cam 162 and extends upward to the pulley cassette. The attachment points 164 and 165 are diametrically opposed to each other. In other embodiments, the attachment points 164 and 165 may be in different locations, but the tethers extend outward in opposite directions. Because of this opposite arrangement, when the load is applied to the harness, the second tether unrolls from the outer cam 162, rotating the second 162 in a clockwise direction (as shown on the page), and the first tether rolls onto the inner cam 163.

The second tether 144 extends generally upward in FIG. 8 because it is redirected by a pulley 166. A small pulley 166, mounted to the bracket 161 for rotation near the top of the bracket 161, redirects the second tether 144 from its horizontal tangent coming off the outer cam 162 into an upward orientation just along the outside of the housing 25 up to the pulley cassette 70. In some embodiments, the pulley 166 directs the second tether 144 inside the housing 25.

With the first tether 143 wrapped around the inner cam 163 and the second tether 144 wrapped around the outer cam 162, in the grooves formed therein, the flat spring 141 and cam assembly 142 together form a constant-force displacement system. In other words, beyond a pre-determined displacement, additional displacement does not significantly change the tension in or force on the second tether 144 required for continued displacement. Further, in other embodiments of the device 10, different cam combinations are used, including assemblies with three or more cams, cams of different sizes and shapes than presented here, similarly-sized cams, etc.

Figure 9:
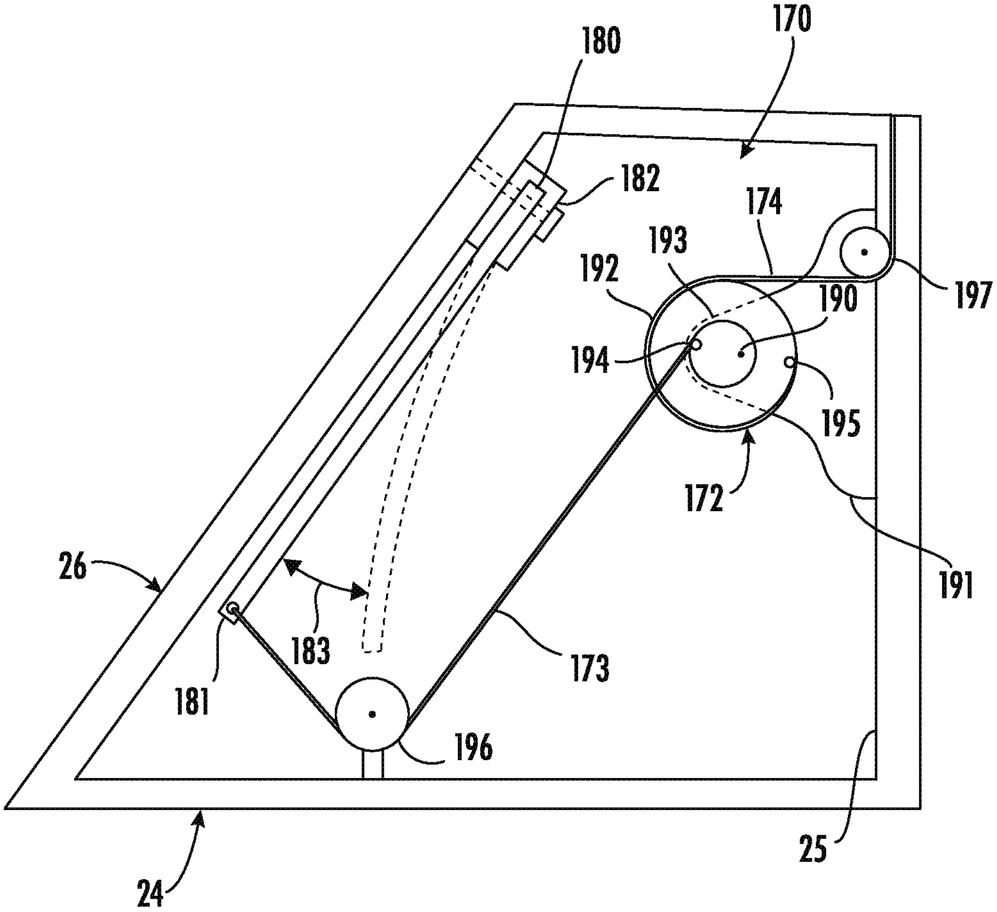

FIG. 9 illustrates a stylized, free-body diagram of an unloading assembly 170 but nevertheless shows the structural elements and features of the assembly 170. The unloading assembly 170 is positioned within the frame 11 between the front tube 26, the main tube 24, and the vertical tube or housing 25.

The unloading assembly 170 includes a flat spring 171, a cam assembly 172, a first tether 173 extending from the flat spring 171 to the cam assembly 172, and a second tether 174 extending from the cam assembly 172 and running inside the housing 25 to the pulley cassette 70 described above. As described, the unloading assembly 170 exerts an unloading force on the harness 91 and a load carried in the harness with respect to the frame 11.

The flat spring 171 is a sprung arm: a lightweight, compact, resilient and elongate flat spring member having a first, fixed end 180 and a second, free end 181. The fixed end 180 is secured in a sleeve mounted on a block 182. Unlike the unloading assembly 140, no adjustment knob is used on the flat spring 171, but the reader will readily appreciate that it could be incorporated, and it should nonetheless be considered part of the scope of the disclosure. Further, in other embodiments, the spring force of the flat spring 171 may be adjusted by an electric, electromechanical or electromagnetic adjustment, or an adjustable bolt, or some other means for changing the spring force.

The flat spring 171 operates as a spring. It is mounted in a diagonal configuration. The block 182 in which the fixed end 180 is secured is fixed to the front tube 26 near its top. The flat spring 171 then extends along the diagonal length of the front tube 26 toward the main tube 24. The free end 181 is below and in front of the fixed end 180 and moves between a first, "unloaded" position as shown in solid line in FIG. 9, and a second, "loaded" position as shown in broken line in FIG. 9, in which the free end 181 is drawn back away from the front tube 26 and toward the housing 25. This movement is indicated by the arcuate double-arrowed line 183.

As with the other unloading assemblies, the flat spring 171 moves toward the loaded position in response to a load being placed in the harness 91, such as by the user 90 walking, and pulling the flat spring 171 down via the second tether 174. In response, the flat spring 171 exerts a biasing force in a direction opposite the pull of gravity and vertical translation of the user 90 downward during locomotion or elongation of the second tether 174 with lateral translation of the pelvis; the flat spring 171 acts to pull the second tether 174 back. Other configurations are possible and may be suitable, including configurations which are vertically or horizontally flipped with respect to the above-described configuration. Generally, however, the diagonal configuration is defined as one in which the spring (the spring arm 171, in this case) extends diagonally, especially but not necessarily along the front tube 26.

The flat spring 171 is a spring which exerts a biasing force in opposition to displacement, whether that is through deflection, extension, or compression. In this sense, other springs may be suitable, such as coil springs, pneumatic springs, torsion springs, etc. The flat spring 171 has a non-constant force-displacement curve, such that the force produced by the flat spring 171 increases as the displacement of the free end 181 increases; at larger displacements, the spring force is larger.

The cam assembly 172 is mounted for rotation on an axle 190 carried on a bracket 191. The bracket 191 is secured to the housing 25 and extends forwardly. The cam assembly 172 includes outer and inner cams 192 and 193. The stacked cam assembly 172 includes outer and inner cams 192 and 193, mounted coaxially side-by-side on the bracket 191. Both cams 192 and 193 are mounted for rotation with respect to each other about the same axis of rotation, however, the cams 192 and 193 are fixed to each other to prevent relative rotation.

The outer cam 192 is larger, and the inner cam 193 is smaller. Both cams 192 and 193 are circular wheels in this embodiment. They are concentric to each other but the axle 190 about which they are mounted is not concentric, and therefore the cams 192 and 193 are eccentrically mounted for rotation. In other words, their axes of rotation are offset from their respective geometric centers, such that as they rotate, their lever arms change and the ratio of their respective lever arms change. In other embodiments, the axle 190 is mounted concentrically to the cams 192 and 193, and in other embodiments, the cams 192 and 193 have shapes other than circles.

The first tether 173 is an inelastic cable, band, cord, or other tether. One end of the first tether 173 is coupled to the free end 181 of the flat spring 171, and the other end of the first tether 173 is coupled to the inner cam 193. The inner cam 193 has at least a single groove formed into its perimeter, and as the inner cam 193 rotates, the first tether 173 rolls and unrolls from this groove.

Similarly, the second tether 174 is an inelastic cable, band, cord, or other tether. One end of the second tether 174 is coupled to the outer cam 192. From there, the second tether 174 extends up through the housing 25 and to the pulley cassette 70 and then eventually to the harness 91. Though the pulley cassette 90 and harness 91 are not shown in FIG. 9, the reader will understand their location and arrangement from the description above. The outer cam 192 has at least a single groove formed into its perimeter, and as the outer cam 192 rotates, the second tether 174 rolls and unrolls from this groove.

The first and second tethers 173 and 174 are arranged oppositely to each other on the cam assembly 172. The first tether 173 is secured at an attachment point 194 on the inner cam 193 and extends downward to the flat spring 171. The second tether 174 is secured at an attachment point 195 on the outer cam 194 and then extends generally upward to the pulley cassette. The attachment points 194 and 195 are diametrically opposed to each other on the cam assembly 172. In other embodiments, the attachment points 194 and 195 may be in different locations, but the tethers extend outward in opposite directions.

Two pulleys 196 and 197 redirect the orientations of the first and second tethers 173 and 174. A first pulley 196 is mounted to the main tube 24 for rotation and redirects the first tether 173. The first tether 173 extends diagonally downward from the free end 181, wraps under and around the first pulley 196, and then extends diagonally upward to the attachment point 194 on the inner cam 193. A second pulley 197 is mounted to the bracket 191 for rotation near the top of the bracket 191. A small cutout is made in the housing 25 to allow the pulley 197 to be partially disposed within housing 25. The pulley 197 redirects the second tether 174 from its horizontal tangent coming off the outer cam 192 into an upward orientation just inside the housing 25 up to the pulley cassette 70. In some embodiments, the pulley 197 directs the second tether 174 along the outside of the housing 25.

With the first tether 173 wrapped around the inner cam 193 and the second tether 174 wrapped around the outer cam 192, in the grooves formed therein, the flat spring 171 and cam assembly 172 together form a constant-force displacement system. In other words, beyond a pre-determined displacement, additional displacement does not significantly change the tension in or force on the second tether 174 required for continued displacement. Further, in other embodiments of the device 10, different cam combinations are used, including assemblies with three or more cams, cams of different sizes and shapes than presented here, similarly-sized cams, etc.

Figure 10A:
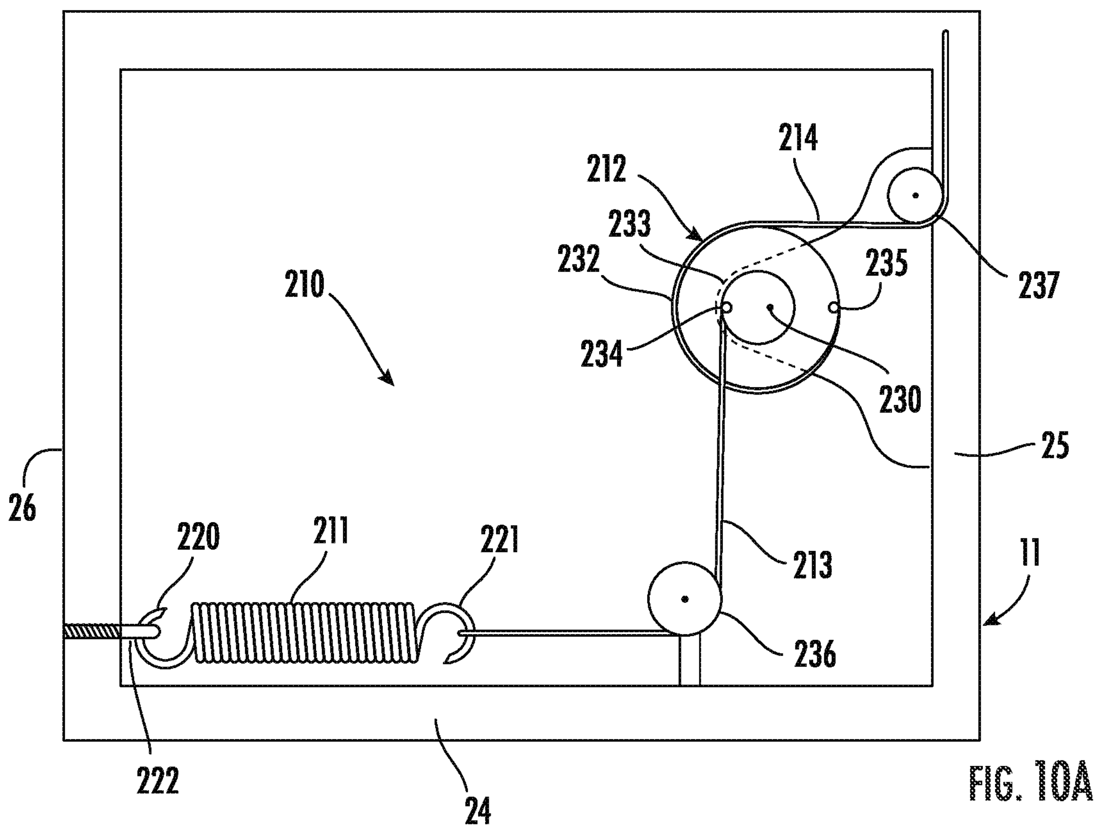
Figure 10B:
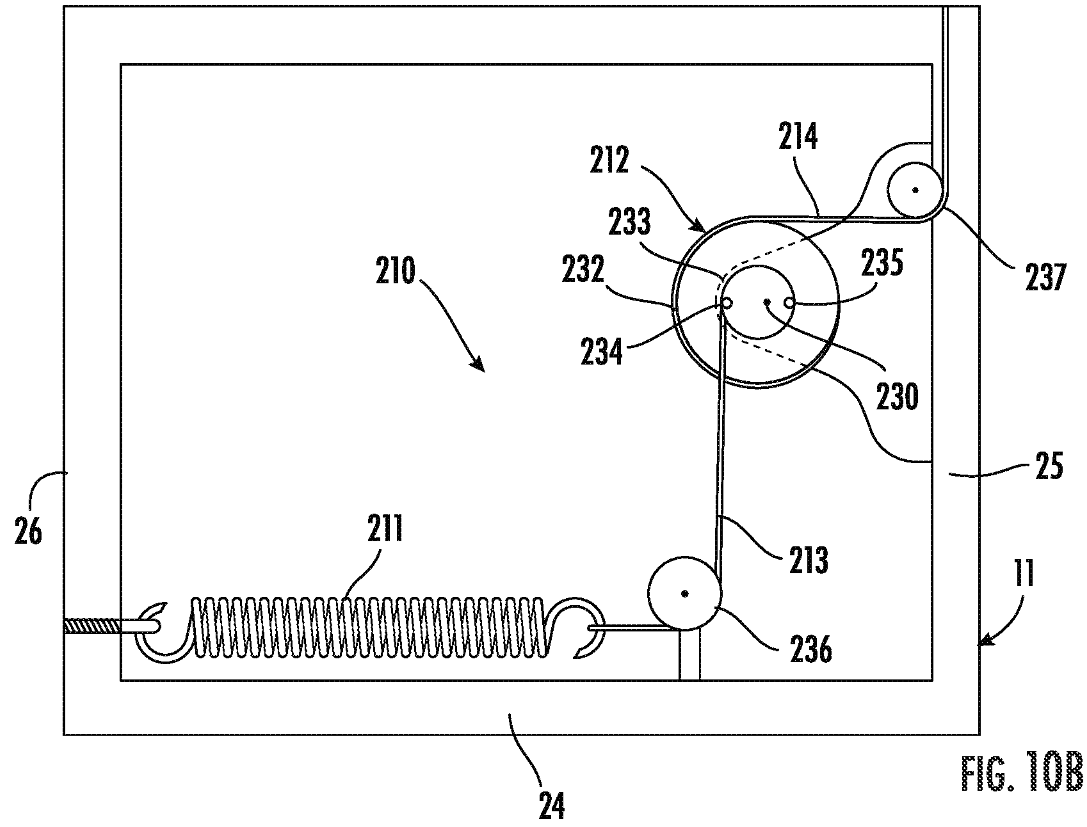

FIGS. 10A and 10B illustrate unloaded and loaded positions of another embodiment of an unloading assembly 210. The drawings are stylized, free-body diagrams but nevertheless show the structural elements and features of the assembly 210. The unloading assembly 210 is positioned within the frame 11 between the front tube 26 (here shown as vertical), the main tube 24, and the vertical tube or housing 25.

The unloading assembly 210 includes a spring 211, a cam assembly 212, a first tether 213 extending from the spring 211 to the cam assembly 212, and a second tether 214 extending from the cam assembly 212 and running inside the housing 25 to the pulley cassette 70 described above. The unloading assembly 210 exerts an unloading force on the harness 91, and a load carried therein, with respect to the frame 11.

The spring 211 is a coiled extension spring. The spring 211 has a first, fixed end 220 and a second, free end 221. The fixed end 220 is coupled to a bolt 222, such as an eye bolt, which is threaded into or otherwise secured in the front tube 26. The spring 211 is mounted in a horizontal configuration, oriented along the horizontal length of the main tube 24. The free end 221 of the spring 211 is disposed toward the housing 24. FIG. 10A shows a first, "unloaded" position, and FIG. 10B shows a second, "loaded" position. In the unloaded position, the spring 211 is compressed and has a shorter length. In the loaded position, the spring 211 is extended and has a longer length. The spring 211 stretches along the length of the main tube 24 when placed under load.

As with the other unloading assemblies, the spring 211 moves toward the loaded position in response to a load being placed in the harness 91, such as by the user 90 walking, and pulling the spring 211 into extension via the second tether 214. In response, the spring 211 exerts a biasing force in a direction opposite the pull of gravity and vertical translation of the user 90 downward during locomotion or elongation of the second tether 214 with lateral translation of the pelvis; the spring 211 acts to pull the second tether 214 back. Other configurations are possible and may be suitable with the spring 211, including configurations which are vertically or horizontally flipped with respect to the above-described configuration. Generally, however, the horizontal configuration is defined as one in which the spring 211 extends horizontally, especially but not necessarily along the main tube 24.

The cam assembly 212 is mounted for rotation on an axle 230 carried on a bracket 231. The bracket 231 is secured to the housing 25 and extends forwardly. The cam assembly 212 includes outer and inner cams 232 and 233. The stacked cam assembly 212 includes outer and inner cams 232 and 233, mounted coaxially side-by-side on the bracket 231. Both cams 232 and 233 are mounted for rotation with respect to each other about the same axis of rotation, however, the cams 232 and 233 are fixed to each other to prevent relative rotation.

The outer cam 232 is larger, and the inner cam 233 is smaller. Both cams 232 and 233 are circular wheels in this embodiment. They are concentric to each other but the axle 230 about which they are mounted is not concentric, and therefore the cams 232 and 233 are eccentrically mounted. In other words, their axes of rotation are offset from their respective geometric centers, such that as they rotate, their lever arms change and the ratio of their respective lever arms change. In other embodiments, the axle 230 is mounted concentrically to the cams 232 and 233, and in other embodiments, the cams 232 and 233 have shapes other than circles.

The first tether 213 is an inelastic cable, band, cord, or other tether. One end of the first tether 213 is coupled to the free end 221 of the spring 211, and the other end of the first tether 213 is coupled to the inner cam 233. The inner cam 233 has at least a single groove formed into its perimeter, and as the inner cam 233 rotates, the first tether 213 rolls and unrolls from this groove.

Similarly, the second tether 214 is an inelastic cable, band, cord, or other tether. One end of the second tether 214 is coupled to the outer cam 232. From there, the second tether 214 extends up through the housing 25 and to the pulley cassette 70 and then eventually to the harness 91. Though the pulley cassette 90 and harness 91 are not shown in FIGS. 10A and 10B, the reader will understand their location and arrangement from the description above. The outer cam 232 has at least a single groove formed into its perimeter, and as the outer cam 232 rotates, the second tether 214 rolls and unrolls from this groove.

The first and second tethers 213 and 214 are arranged oppositely to each other on the cam assembly 212. The first tether 213 is secured at an attachment point 234 on the inner cam 233 and extends generally downward to the spring 211. The second tether 214 is secured at an attachment point 235 on the outer cam 234 and then extends generally upward to the pulley cassette. The attachment points 234 and 235 are diametrically opposed to each other on the cam assembly 212. In other embodiments, the attachment points 234 and 235 may be in different locations, but the tethers extend outward in opposite directions.

Two pulleys 236 and 237 redirect the orientations of the first and second tethers 213 and 214. A first pulley 236 is mounted to the main tube 24 for rotation and redirects the first tether 213. The first tether 213 extends horizontally from the free end 221 of the spring 211, wraps around the first pulley 236, and then extends vertically upward to the attachment point 234 on the inner cam 233. A second pulley 237 is mounted to the bracket 231 for rotation near the top of the bracket 231 and slightly within the housing 25. It redirects the second tether 214 from its horizontal tangent coming off the outer cam 232 into an upward orientation just inside the housing 25 up to the pulley cassette 70. In some embodiments, the pulley 237 directs the second tether 214 along the outside of the housing 25.

With the first tether 213 wrapped around the inner cam 233 and the second tether 214 wrapped around the outer cam 232, in the grooves formed therein, the spring 211 and cam assembly 212 together form a constant-force displacement system. In other words, beyond a pre-determined displacement, additional displacement does not significantly change the tension in or force on the second tether 214 required for continued displacement. Further, in other embodiments of the device 10, different cam combinations are used, including assemblies with three or more cams, cams of different sizes and shapes than presented here, similarly-sized cams, etc.

Figure 11A:
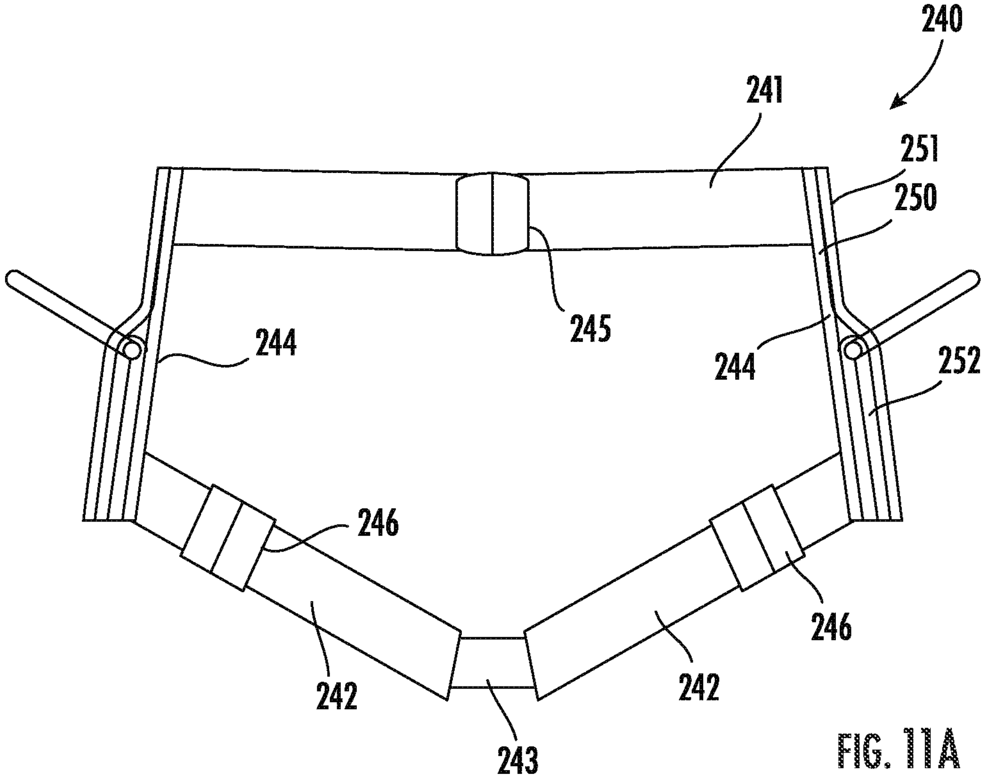
FIGS. 11A-11C are front, side, and perspective views of a harness, and components thereof, for use in the bodyweight unloading locomotive devices.
Figure 11B:
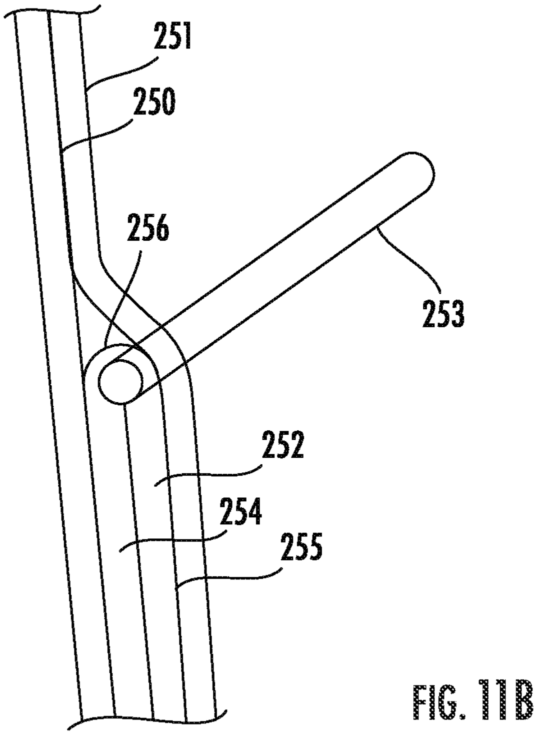
Figure 11C:
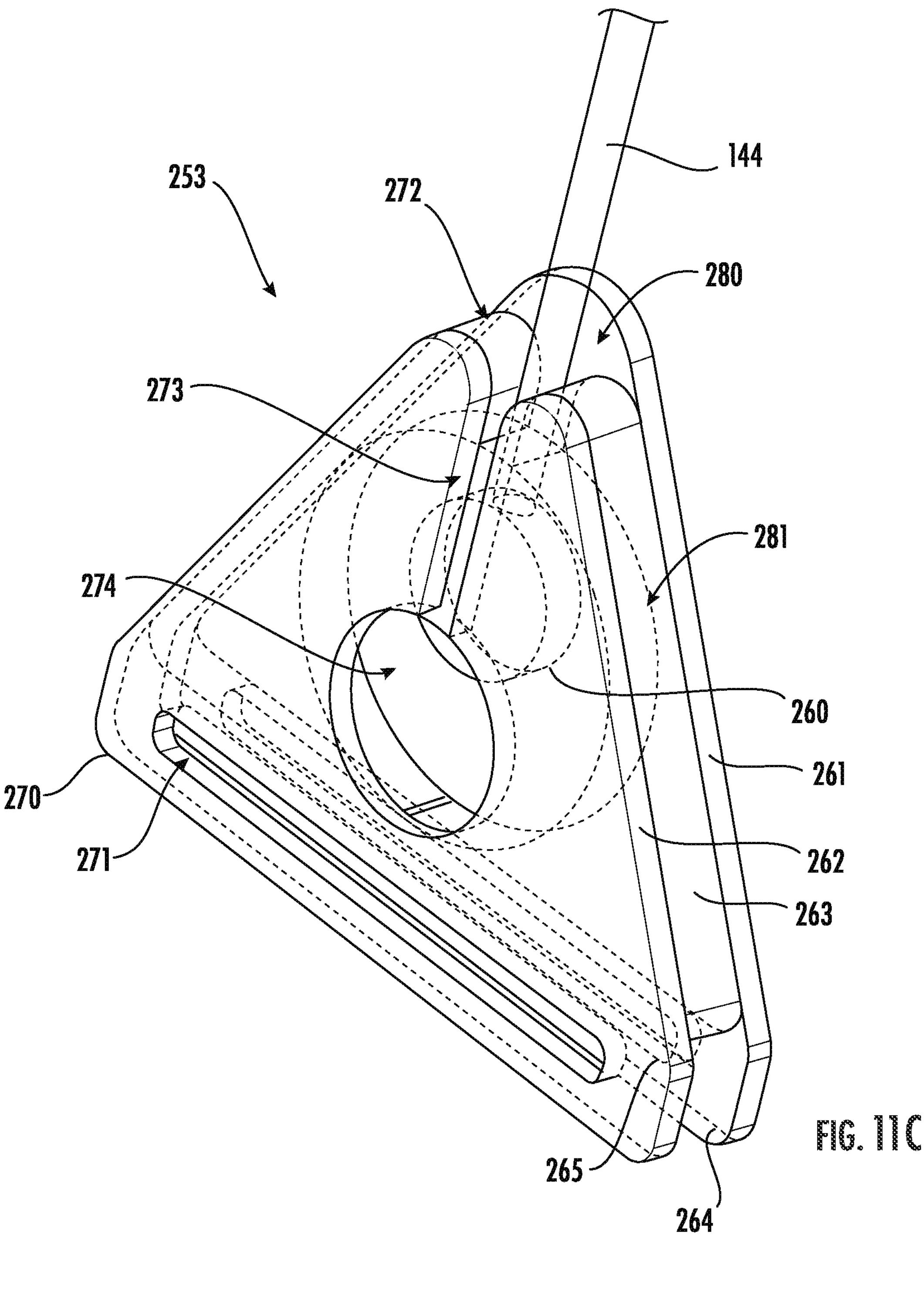

FIGS. 11A-11C illustrate a harness 240 and components thereof. The harness 240 is preferably used instead of the harness 91 described above. This harness 240 includes an adjustable waist belt 241, adjustable thigh straps 242, a cross-piece 243 connecting the thigh straps 242, and outer or lateral straps 244 on each side of the harness 240 inelastically connecting the waist belt 241 to each of the thigh straps 242.

The waist belt 241 is a length of webbing or other suitable strong and durable material, fastened into a loop with a buckle 245 at the front of the harness 240. Similarly, the thigh straps 242 are each lengths of webbing or other suitable strong and durable material, fastened into loops with buckles 246. The length of webbing may be pulled through the buckles 245 and 246 to adjust each of the waist belt 241 and thigh straps 242 so that they fit the user snugly.

The lateral straps 244 couple the thigh straps 242 to the waist belt 241. The lateral straps 244 are identical and only one is described herein, with the understanding that the description applies equally to both. The lateral strap 244, shown in both FIGS. 11A and 11B, includes an inner strap 250 and an outer strap 251. The inner strap 250 is a length of webbing or other suitably strong and durable material and is sewn directly to the waist belt 241 and the thigh strap 242. The outer strap 251 is also a length of webbing or other suitably strong and durable material. The outer strap 251 is sewn to the inner strap 250 along approximately the top half of the inner strap 250. The outer strap 251 then separates from the inner strap 250. A ring strap 252 is disposed between the inner and outer straps 250 and 251 along the bottom half thereof.

The ring strap 252 holds the ring 253 shown in FIG. 11C. The ring strap 252 is a length of webbing or other suitably strong and durable material, folded over itself to define an inner portion 254, an outer portion 255, and a bend 256 at the top between the inner and outer portions 254 and 255. During manufacture of the harness 240, the ring 253 is fit between the inner and outer portions 254 and 255 and disposed in and against the bend 256. Then, the inner and outer portions 254 and 255 are sewn to each other to close the ring strap 252 and secure the ring 253 therein. The outer strap 251 is further sewn onto the outer portion 255 of the ring strap 252, and in some cases also sewn to the inner portion 254 and/or the inner strap 250 to secure the lateral strap 244.

The ring 253 is secured in the lateral strap 244 to hold one of the tethers. In FIG. 11C, the tether identified with reference character 144 is used, corresponding to the unloading assembly 140 of FIG. 8, but the reader should understand that the second tether 144 could be one of the other various tethers (or first or second tethers) described in this specification which leads from an unloading assembly. The second tether 144 terminates in a disc-shaped puck 260 shown in broken line in FIG. 11C. The puck 260 is hard, durable, and permanently fixed to the end of the second tether 144. It slips into and is secured in the ring 253 to couple and engage the harness 240 to the unloading assembly 140.

The ring 253 includes a backer plate 261, a front plate 262, and a sidewall 263 formed therebetween. The backer plate 261 is flat and triangular, having a bottom 264 through which a longitudinal slot 265 is formed entirely. The slot 265 is shown in broken line in FIG. 11C. The front plate 262 is flat and generally triangular. The front plate 262 has a bottom 270 through which a longitudinal slot 271 is formed entirely. The slots 265 and 271 are coextensive and registered with each other. The bend 256 of the ring strap 252 is passed through both of the slots 265 and 271 to secure the ring 253 to the lateral strap 244.

The front plate 262 also has an open top 272. A slit 273 is formed medially through the front plate 262, between the open top 272 and a circular hole 274. The top 272, slit 273, and hole 274 cooperate to define a passage for the end of the second tether 144. The second tether 144 and puck 260 are applied through that passage and then moved upward, thereby becoming captured within the ring 253. The sidewall 263 prevents the puck 260 from coming loose from the ring 253. The sidewall 263 extends between the back and front plates 261 and 262 and includes an opening 280 registered with and below the open top 272 of the front plate 262. From the opening 280, the sidewall 263 is registered along the outside of the ring 253 to just above the slots 265 and 271. The sidewall has a large internal cavity 281, shown in broken line in FIG. 11C. The internal cavity 281 is preferably but not necessarily circular. The internal cavity 281 is offset from the circular hole 274, proximate the top of the ring 253. In this way, when the puck 260 is applied through the circular hole 274, it moves into the internal cavity 281. When a user wears the harness 240 and applies a load to the unloading assembly 140, the puck 260 will slide upward within the internal cavity 281 toward the top of the ring 253, into a captured position where it cannot inadvertently come loose. The puck 260 cannot be withdrawn from the ring 253 without unloading the tether 144 and pulling the puck 260 down and out of the circular hole 274.

The embodiments of the unloading assemblies 140, 170, and 210 are used in the device 10 similarly to the unloading assemblies 13 and 14. The harness 240 is used similarly in the device 10 to the harness 91. Based on the foregoing descriptions, the reader will understand the operation of the device with substitution of any of the unloading assemblies 140, 170, or 210 or with the harness 240.

Figure 12A:
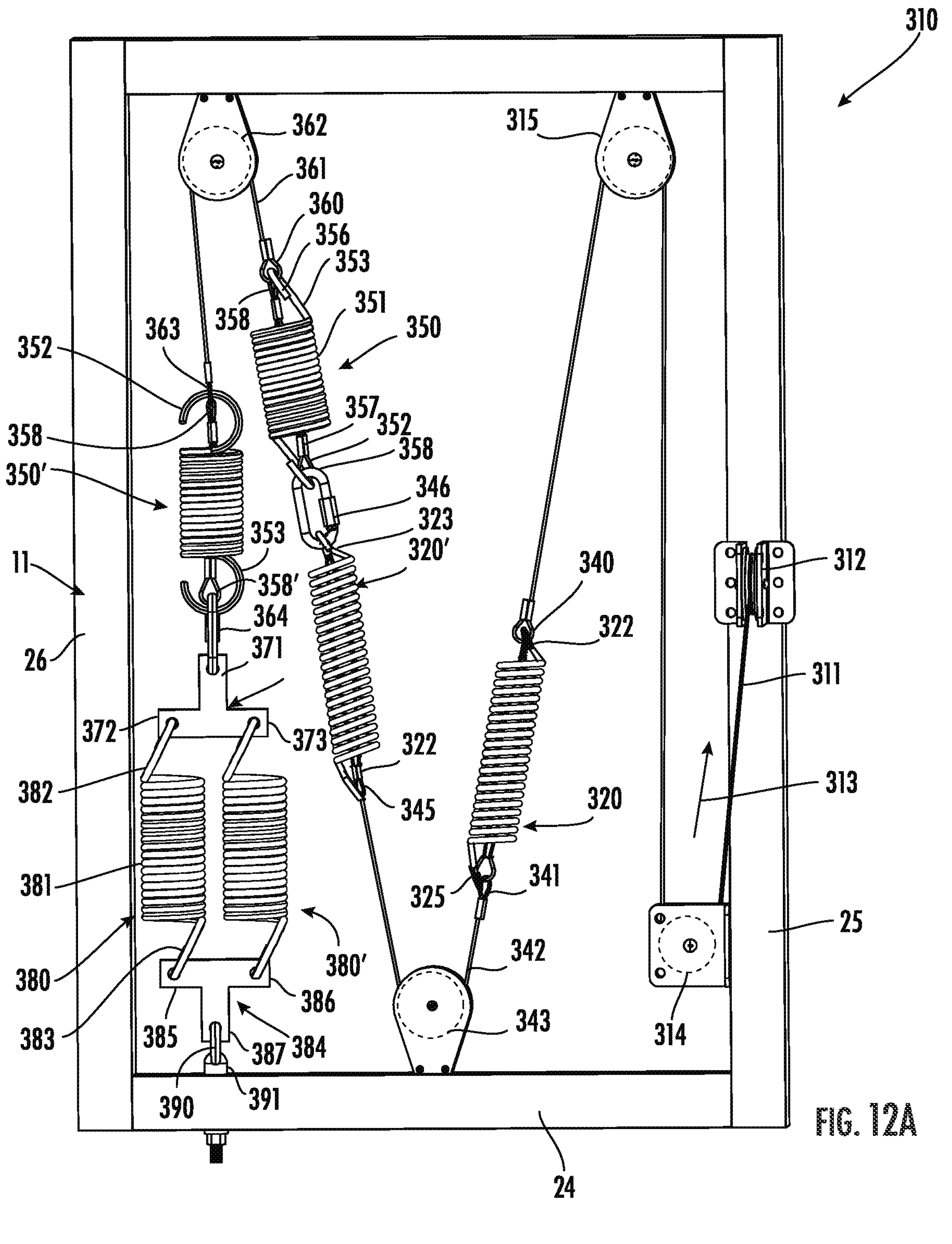
FIGS. 12A and 12B are enlarged, generalized diagrams illustrating alternate embodiments of a stabilizing unloading assembly.
Figure 12B:
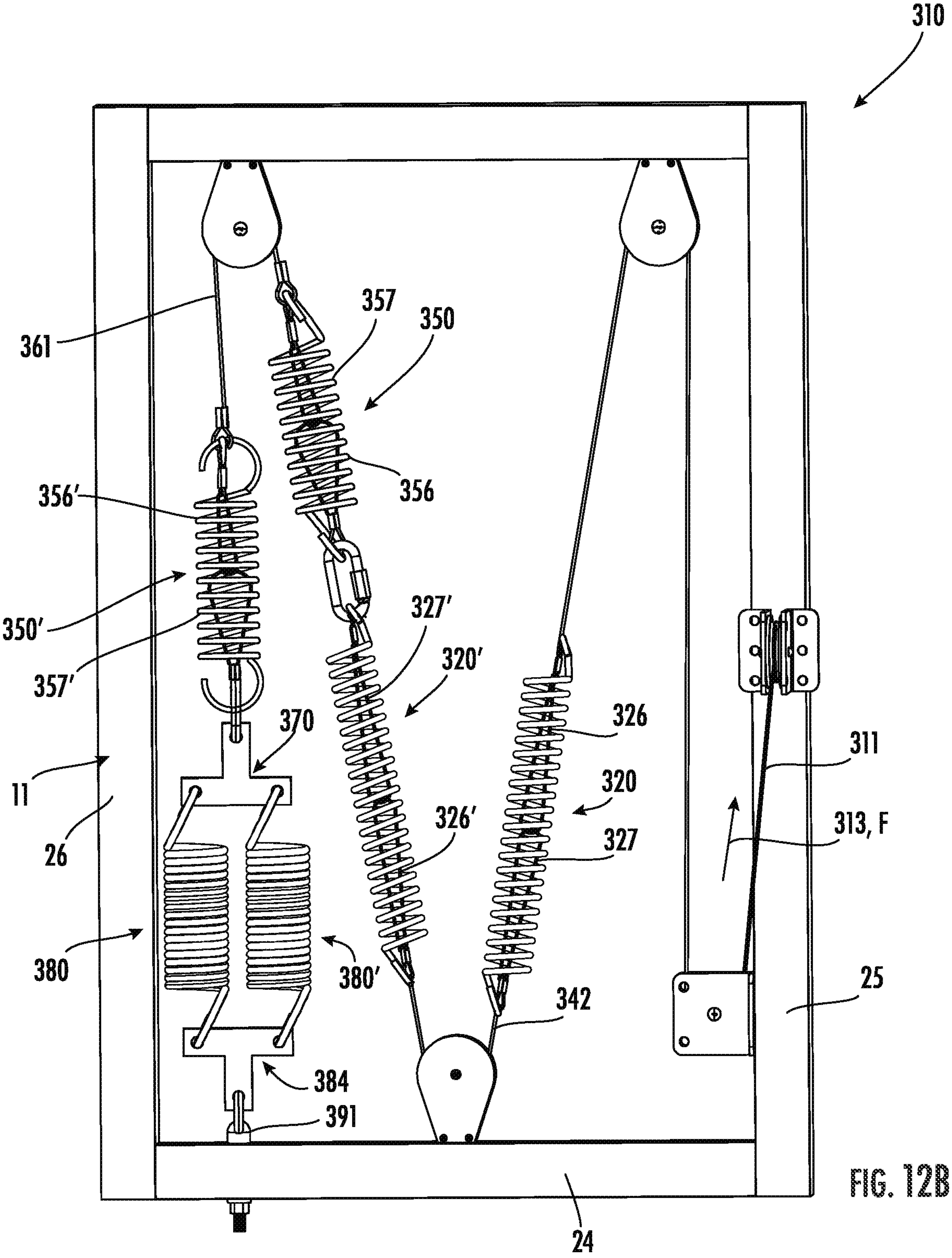

FIGS. 12A and 12B illustrate unloaded and loaded positions of another embodiment of a stabilizing assembly 310. The stabilizing assembly 310 is positioned within a version of the frame 11 between the front tube 26 (here shown as vertical), the main tube 24, and the vertical tube or housing 25. The stabilizing assembly 310 is useful for stabilizing a user in the device to prevent the user from excessive tilt, lean, or sway beyond the line of gravity. The stabilizing assembly 310 is useful for maintaining the posture of a user within a defined space within the device.

The stabilizing assembly 310 includes a set of springs, tethers, and pulleys which produce a force opposing the force of gravity on the body created by a user leaning to one side of the device or another, which force is applied to the harness 240 of previous embodiments. The assembly 310 includes a lead tether 311 which enters the housing 25 and can be either directly or indirectly connected to the harness 240, preferably in a generally horizontal direction from the housing 25 to the harness 240. In the embodiment shown in these drawings, the lead tether 311 routes around a pulley 312 before it enters the housing 25 and extends to the harness 240.

When the user puts on the harness 240 and uses the device, he generates a force along the lead tether 311 in the direction indicated by the arrowed line 313. This force propagates through the entire stabilizing assembly 310. The stabilizing assembly 310 acts to counter that force.

From the pulley 312, the lead tether 311 extends down to another pulley 314 mounted on the side of the housing 25. The pulley 314 is mounted for rotation between two plates, and so is shown in hidden, broken line in FIG. 12A. The lead tether 311 routes around the pulley 314 and then extends up to yet another pulley 315. This pulley 315 is mounted for rotation between two plates and is also shown in hidden line. The pulley 315 is mounted to the top of the frame 11. The pulleys 314 and 315 are not critical for the design but help align the assembly 310 within the frame 11. The lead tether 311 then routes around the pulley 315 and extends back down to a light spring assembly 320. The light spring assembly 320 is shown in detail in FIGS. 13A and 13B, in first and second conditions.

Figure 13A:
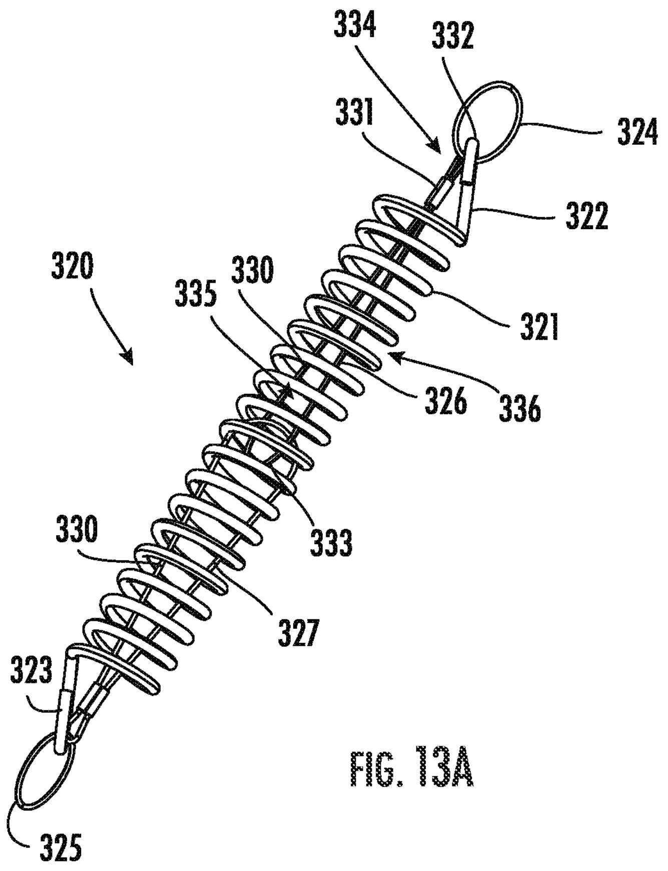
FIGS. 13A and 13B are enlarged views of a spring assembly used in the stabilizing unloading assembly of FIGS. 12A and 12B.
Figure 13B:
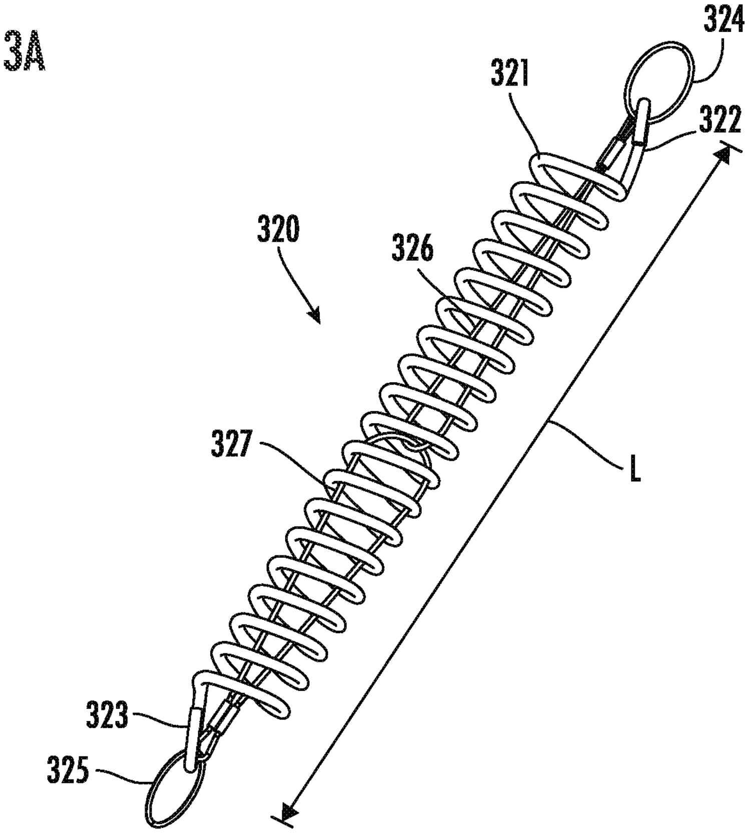

Turning to those FIGS. 13A and 13B, the light spring assembly 320 includes a coiled extension spring 321 terminating in two opposed hooks 322 and 323 coupled to rings 324 and 325, respectively. The coiled extension spring 321 is constructed from a material or combination of materials having resilient spring properties, such as metal. Preferably, the coiled extension spring 321 has a linear or constant rate, such that the spring 321 deforms evenly across its length in response to application of force. In other embodiments, however, it is preferable for the spring to have a dual, progressive, variable, or other type of rate.

The light spring assembly 320 also includes two lockout means 326 and 327. The lockout means or, more simply, "lockouts" 326 and 327 can have a variety of structures, features, and constructions. In the exemplary embodiment shown here, the lockouts 326 and 327 are two inextensible loops connected to each other. In other embodiments, the lockout means is a hydraulic or pneumatic piston, or a solenoid. In other embodiments, the lockout means may be interconnected sliders. In yet other embodiments, the lockout means has other structures and configurations.

The lockouts 326 and 327 shown in these drawings are identical, and so only the lockout 326 is described in detail here, with the understanding that the description applies equally to the lockout 327. The lockout 327 has the same structural elements and features as the lockout 326, and so the description here adopts the same reference characters to denote those structural elements and features of the lockout 327, except that they are marked with a prime ("'") symbol to distinguish them from those of the lockout 326.

The lockout 326 is constructed from a cable 330, preferably a metal cable with inextensible and inelastic material characteristics. The cable 330 has the form of a continuous loop with no gaps, free ends, or discontinuities. A double ferrule 331 is placed over the cable 330 proximate a first end 332. The double ferrule 331 is a fitting with two ferrules or rings registered side-by-side. It is clamped or crimped onto the cable 330. The double ferrule 331 binds two opposed sides of the cable 330 closely to each other, thereby forming a first loop 334 proximate to the first end 332 of the cable 330. The double ferrule 331 also defines a second loop 335. The second loop 335 extends from the double ferrule 331 to the second end 333 and is comparatively much larger than the first loop 334.

Most of the length of the lockout 326 is within the light spring assembly 320, in an interior space 336 bound by the coiled extension spring 321. The coils of the coiled extension spring 321 hold the lockout 326 in that interior space 336. The cable 330 has some rigidity and so cannot inadvertently escape the confines of the coiled extension spring 321. The double ferrule 331 and the first loop 334 are both just beyond the coils of the coiled extension spring 321, proximate the hook 322.

The first loop 334 is coupled to the ring 324, so that the lockout 326 is secured to the ring 324. The second loop 335 of the cable 330 is disposed within the interior space 336 of the coiled extension spring 321 and is interconnected with the cable 330' of the lockout 327. The two second loops 335 and 335' intersect and overlap each other, such that the cable 330 of the loop 335 passes through the loop 335' of the other cable 330'. Because of this, pulling either one of the loops 335 and 335' draws that loop taught against the other loop.

The cables 330 and 330' of the lockouts 326 and 327 are inextensible. While they are flexible in most directions when loose, once they are pulled tight in opposite directions along the length of the coiled extension spring 321 and all slack in the cables 330 and 330' disappears, the cables 330 and 330' are taught against each other and reach a maximum combined extension length, shown with the reference character L in FIG. 13B. Once so pulled, the cables 330 and 330' are inextensible, inflexible along that direction of the coiled extension spring 321, though still capable of flexing in other directions. The maximum combined extension length L defines a maximum extension of the light spring assembly 320, beyond which the light spring assembly 320 cannot be stretched.

The hooks 322 and 323 of the light spring assembly 320 are connected, respectively, to the rings 324 and 325 like the first loops 334 and 334'. Thus, when the rings 324 and 325 are pulled apart, the hooks 322 and 323 are pulled apart, and the coiled extension spring 321 produces a force in opposition to the direction of the pull. If the rings 324 and 325 are pulled apart to the maximum length L, then the lockouts 326 and 327 become taught and prevent the light spring assembly 320 from extending any further. This defines a second or extended position of the light spring assembly 320. When the light spring assembly 320 is stretched to the maximum length L, it continues to produce a force in opposition to the direction of the pull, but it also acts as a rigid and inextensible element along the direction of the pull, preventing further stretch and thus transferring force further down the stabilizing assembly 310.

In the embodiment shown in FIGS. 12A, the hook 322 is connected to an eyelet 340 at the end of the lead tether 311. The other hook 323 is connected to an eyelet 341 of an intermediate tether 342. The first loops 334 and 334' of the lockouts 326 and 327 of the light spring assembly 320 are also connected to the eyelets 340 and 341, respectively. FIG. 12A shows the light spring assembly 310 in a first or compressed position. In other embodiments of the stabilizing assembly, the lead tether 311 terminates in a looped end, and a ring, coupler, link with a jaw, or like fastener connects the looped end of the lead tether 311 to the light spring assembly 320. All tethers described herein may also have this alternate construction.

The intermediate tether 342 extends down to a pulley 343 mounted to the main tube 24. The pulley 343 is mounted for rotation between two plates, and so is shown in hidden, broken line in FIG. 12A. The intermediate tether 342 routes around the pulley 343 and then extends up to another light spring assembly 320', identified with a prime symbol ("'") to distinguish it from the other light spring assembly 320. The light spring assembly 320' is identical to the light spring assembly 320. Its hook 322 and its first loop 334 are attached to an eyelet 345 at the end of the intermediate tether 342. Its other hook 323 and the first loop 334' are connected to a coupler 346, such as a carabiner or other coupler with a moveable jaw or the like. In other embodiments, the coupler 346 is another tether similar to the lead and intermediate tethers 311 and 342.

The coupler 346 is a linkage with a gate or other mechanism allowing the light spring assembly 320' to be removably attached. The coupler 346 is also attached to a medium spring assembly 350.

The medium spring assembly 350 is similar to the light spring assembly 320 in many respects. The medium spring assembly 350 includes the same structural elements as the light spring assembly 320, such as a coiled extension spring 351 and hooks 352 and 353. The coiled extension spring 351 is constructed from a material or combination of materials having resilient spring properties, such as metal. The coiled extension spring 351 has a linear or constant rate, such that the spring 351 deforms evenly across its length in response to application of force. In other embodiments, however, it is preferable for the coiled extension spring 351 to have a dual, progressive, variable, or other type of rate.

The coiled extension spring 351 has a higher spring constant than the spring constant of the coiled extension spring 321 of the light spring assembly 320. This means that a greater force must be applied to the medium spring assembly 350 to produce the same stretch or displacement that is achieved when a lower force is applied to the light spring assembly 320. Said in another way, a force applied to the medium spring assembly 350 will result in a smaller displacement than will the same force applied to the light spring assembly 320.

The medium spring assembly 350 also includes two lockouts 356 and 357. The lockouts 356 and 357 can have a variety of structures, features, and constructions. In the embodiment shown here, the lockouts 356 and 357 are two inextensible loops connected to each other. The lockouts 356 and 357 are identical to each other and to the lockouts 326 and 327, so description of their structural elements and features is not necessary here. The lockouts 356 and 357 terminate in first loops 358 and 358' which are identical to the first loops 334 and 334'. In some embodiments, it is preferable that the cables of the lockouts 356 and 357 have a thicker gauge or greater strength than do the lockouts 326 and 327.

Both the hook 352 and the first loop 358 of the medium spring assembly 350 are attached to the coupler 346. At the other end of the medium spring assembly 350, both the hook 353 and the first loop 358' are attached to an eyelet 360 at an end of a tail tether 361. The tail tether 361 extends up to a pulley 362 mounted to the top of the frame 11. The pulley 362 is mounted for rotation between two plates, and is shown in hidden, broken line in FIG. 12A. The tail tether 361 routes around the pulley 362 and then extends down to terminate an eyelet 363 connected to another medium spring assembly 350'. The medium spring assembly 350' is identified with a prime symbol ("'") to distinguish it from the other medium spring assembly 350.

The medium spring assembly 350' is identical to the medium spring assembly 350 already described. Its hook 352 and its first loop 358 are attached to the eyelet 363 on the tail tether 361. Its other hook 353 and the first loop 358' are connected to a coupler 364, such as a carabiner. In other embodiments, the coupler 364 is another tether similar to the lead, intermediate, or tail tethers 311, 342, or 361.

The coupler 364 is a linkage with a gate or other mechanism allowing the medium spring assembly 350' to be removably attached. The coupler 364 is also attached to a yoke 370. The yoke 370 includes an upstanding (as it is oriented in the view of FIG. 12A) tab 371 and two lateral tabs 372 and 373 projecting laterally and oppositely to each other below the upstanding tab 371. The yoke 370 is rigid, constructed from a material having rigid qualities, like metal or high-density plastic. Each of the tabs 371, 372, and 373 is formed with through-holes. The medium spring assembly 350' is coupled to the though-hole in the upstanding tab 371.

Two heavy spring assemblies 380 and 380' are connected to the through-holes in the tabs 372 and 373, respectively. The heavy spring assemblies 380 and 380' are identical to each other in every way except location, and as such, this specification describes only the heavy spring assembly 380 with the understanding that the description applies equally to the heavy spring assembly 380'. The drawings use the same reference characters for the various structural elements and features of both of the heavy spring assemblies 380 and 380', but those of the heavy spring assembly 380' carry a prime ("'") symbol to distinguish them from those of the heavy spring assembly 380.

The heavy spring assembly 380 includes a coiled extension spring 381. The coiled extension spring 381 terminates in two opposed hooks 382 and 383. The coiled extension spring 381 is constructed from a material or combination of materials having resilient spring properties, such as metal. Preferably, the coiled extension spring 381 has a linear or constant rate, such that the spring 381 deforms evenly across its length in response to application of force. In other embodiments, however, it is preferable for the spring to have a dual, progressive, variable, or other type of rate.

The coiled extension spring 381 has a higher spring constant than the spring constant of either of the coiled extension springs 321 and 351 of the light and medium spring assemblies 320 and 350. A force applied to the heavy spring assembly 380 will result in a smaller displacement than will the same force applied to the medium spring assembly 350.

In the embodiment shown in FIGS. 12A and 12B, the heavy spring assembly 380 includes the coiled extension spring 381 and no internal lockouts. This is possible because the spring constant of the coiled extension 381 is preferably very high, and the heavy spring assembly 380 is unlikely to displace or stretch very far under even the highest loads. However, in some embodiments, it may still be preferable that the heavy spring assembly 380 includes lockouts and structures similar to those of the medium and light spring assemblies 350 and 320.

In such alternate embodiments, the heavy spring assembly 380 includes two lockouts. Preferably, those lockouts are inextensible loops constructed from cable interconnected with each other. The cable is preferably constructed from metal in the form of a continuous loop with no gaps, free ends, breaks, or other discontinuities. More preferably, the cable is a braided metal wire rope. A double ferrule is fit over the cable proximate a first end of the cable and is clamped or crimped onto the cable. This binds two opposed sides of the cable closely to each other, thereby forming a small first loop and a larger second loop.

Most of the length of the lockout is within this alternate embodiment of the heavy spring assembly 380, in an interior space bound by the coiled extension spring 381. The coils of the coiled extension spring 381 hold the lockout in that interior space. The cable of the lockout has rigidity and so cannot inadvertently escape the confines of the coiled extension spring 381. The double ferrule and the first loop are both just beyond the coils of the coiled extension spring 381, proximate the hook 382. Both the first hook 382 and the first loop are then preferably coupled to a ring. The second loop is disposed in the interior space within the coiled extension spring and is interconnected with the second loop of the heavy spring assembly's other lockout. Those two second loops intersect and overlap each other, such that pulling either of the lockouts of the heavy spring assembly draws that lockout taught against the other lockout.

Still describing the alternate embodiment of the heavy spring assembly, the cables of the lockouts are inextensible, so that once they are pulled in opposite directions and all slack in the cables disappears, the cables are taught against each other and reach a maximum extension length, which defines a maximum extension of the alternate heavy spring assembly embodiment, beyond which it cannot be stretched.

Returning to the embodiment shown in FIG. 12A, the hooks 383 and 383' of the heavy spring assemblies 380 and 380' are attached to a yoke 384. The yoke 384 is a rigid piece of material constructed from metal or high-density plastic and resists deformation. The yoke 384 includes two lateral tabs 385 and 386 projecting laterally and oppositely to each other, and a downwardly-projecting or depending tab 387 extending downward from between the two lateral tabs 385 and 386. Each of the tabs 385, 386, and 387 is formed with a through-hole. The heavy spring assemblies 380 and 380' are coupled to the through-holes in the lateral tabs 385 and 386, respectively. A coupler 390 is coupled to the through-hole in the depending tab 387. The coupler 390 is a linkage such as a carabiner, and preferably includes a gate or other mechanism so that it can be easily slipped onto the yoke 384. The coupler 390 is also attached to an anchor 391 fixed in the main tube 24 of the frame 11, thereby securing the yoke 384 in place proximate to the main tube 24.

In operation, the embodiment of the stabilizing assembly 310 is used similarly to the unloading assemblies 13, 14, 140, 170, and 210 and can be used with the harnesses 91 and 240. For these purposes, this specification describes use of the stabilizing assembly 310 with the harness 240. The user dons the harness 240 so that the rings 253 are disposed near the user's hips. On one side of the device, the user attaches the lead tether 311 of the stabilizing assembly 310 on that side to the one of the rings 253 also on that side. On the other side of the device, the user attaches the lead tether of that side's stabilizing assembly 310 to the other ring 253.

The lead tether 311 extends from the harness 240 into the frame housing 25, as shown in FIG. 12A and then through the pulleys 314 and 315 to the light spring assembly 320. FIG. 12A shows the stabilizing assembly 310 from one side of the device, and the reader will understand that an identical stabilizing assembly 310 is on the other side of the device. In the view of FIG. 12A, the stabilizing assembly 310 is in a first or unloaded position, and it moves into a second or loaded position, as shown in FIG. 12B, when a force is applied at the ring 253 on the respective side of the harness 240.

As the user moves horizontally with the device and dips, the ring 253 pulls on the lead tether 311, exerting a loading force F along the lead tether 311 in the direction indicated by the arrowed line 313 in FIG. 12A. This force F propagates through the entire stabilizing assembly 310, causing the stabilizing assembly 310 to move into the loaded position shown in FIG. 12B. The stabilizing assembly 310 responds in opposition to that force F, producing a stabilizing force felt by the user and returning the user toward a neutral position with respect to the device.

The loading force F has a magnitude which propagates through the lead tether 311. The lead tether 311, and the intermediate tether 342 and the tail tether 361 are constructed from an inelastic and inextensible material such as metal or synthetic fiber. As such, the tethers 311, 342, and 361 do not stretch under the force F and transfer all of the force F along their lengths. Thus, the force F propagates through the entire stabilizing assembly 310, including the tethers 311, 342, and 361 as well as the light, medium, and heavy spring assemblies 320, 320', 350, 350' 380, and 380'.

Each of the spring assemblies responds differently to the force F because of their different spring constants and their different positions relative each other.

The light and medium spring assemblies 320, 320', 350, and 350' are arranged in series along the lead 311 and intermediate tethers 342 and 361. The pull force F applies equally to all of them.

Application of force F causes the light spring assembly 320 to yield and stretch according to its spring constant, up until the point at which the lockouts 326 and 327 are pulled taught. Application of force F causes the other light spring assembly 320' to also yield and stretch according to its spring constant, up until the point at which the lockouts 326 and 327 are pulled taught. Because the light spring assemblies 320 and 320' are identical in every respect to each other but for location, they stretch at the same rate and lock out at the same displacement as each other. FIG. 12B shows the lockouts 326 and 327 of the light spring assembly 320 pulled against each other but not taught. When the light spring assembly 320 locks out, the lockouts 326 and 327 are pulled taught. However, showing the lockouts 326 and 327 pulled taught would make them difficult discern in these drawings.

In some cases, where the pull force F is low, only the light spring assemblies 320 and 320' may stretch; the pull force F may be too small to produce a noticeable displacement in the other spring assemblies. In other cases, where the pull force F is higher, the light spring assemblies 320 and 320' stretch and lock out, and the medium spring assemblies 350 and 350' yield and stretch as well.

In such cases in which the pull force F is higher, the medium spring assemblies 350 and 350' noticeably yield. Because the medium spring assemblies 350 and 350' are arranged in series with the light spring assemblies 320 and 320', they are subjected to the same force F at the same time as the light spring assemblies 320 and 320'. Application of that force F causes the medium spring assembly 350 to yield and stretch according to its spring constant, up until the point at which its lockouts 356 and 357 are pulled taught. Then the medium spring assembly 350 becomes inextensible and stretches no more. Application of the force F causes the other medium spring assembly 350' to also yield and stretch according to its spring constant, up until the point at which its lockouts are pulled taught. Because the medium spring assemblies 350 and 350' are identical in every respect to each other but for location, they stretch at the same rate and lock out at the same displacement as each other. FIG. 12B shows the lockouts 356 and 357 of the medium spring assembly 320 pulled against each other but not taught. When the medium spring assembly 320 locks out, the lockouts 356 and 357 are pulled taught. However, showing the lockouts 356 and 357 pulled taught would make them difficult discern in these drawings.

In cases in which the pull force F is much higher, the heavy spring assemblies 380 and 380' noticeably yield. Because the heavy spring assemblies 380 and 380' are arranged in series with the light and medium spring assemblies 320, 320', 350 and 350', they are subjected to the same force F at the same time as the light and medium spring assemblies 320, 320', 350 and 350'. However, because the heavy spring assemblies 380 and 380' are arranged in parallel with each other, each of the heavy spring assemblies 380 and 380' is subject to half of the force F, or a force F/2.

Application of that force F/2 causes the heavy spring assemblies 380 and 380' to yield and stretch according to their spring constants. Preferably, the spring constants are very high, and the heavy spring assemblies yield 380 and 380' very little and only in response to very high forces. In embodiments in which incredibly high forces may be experienced, the alternate heavy spring assembly embodiment may be preferred. That alternate embodiment uses lockouts to limit further movement of the harness 240. In that alternate embodiment, the heavy spring assemblies 380 and 380' yield up until the point at which their lockouts are pulled taught. Generally, however, the alternate embodiment of the heavy spring assembly is not necessary, and the embodiment shown in these drawings is sufficient.

As the user walks, the stabilizing assembly 310 cycles between the loaded and unloaded position, or between positions between the loaded and unloaded positions. The stabilizing assembly 310 produces a stabilizing force in opposition to the pull force F created by the user's motion, so that the user feels more stable or in balance.

Figure 14:
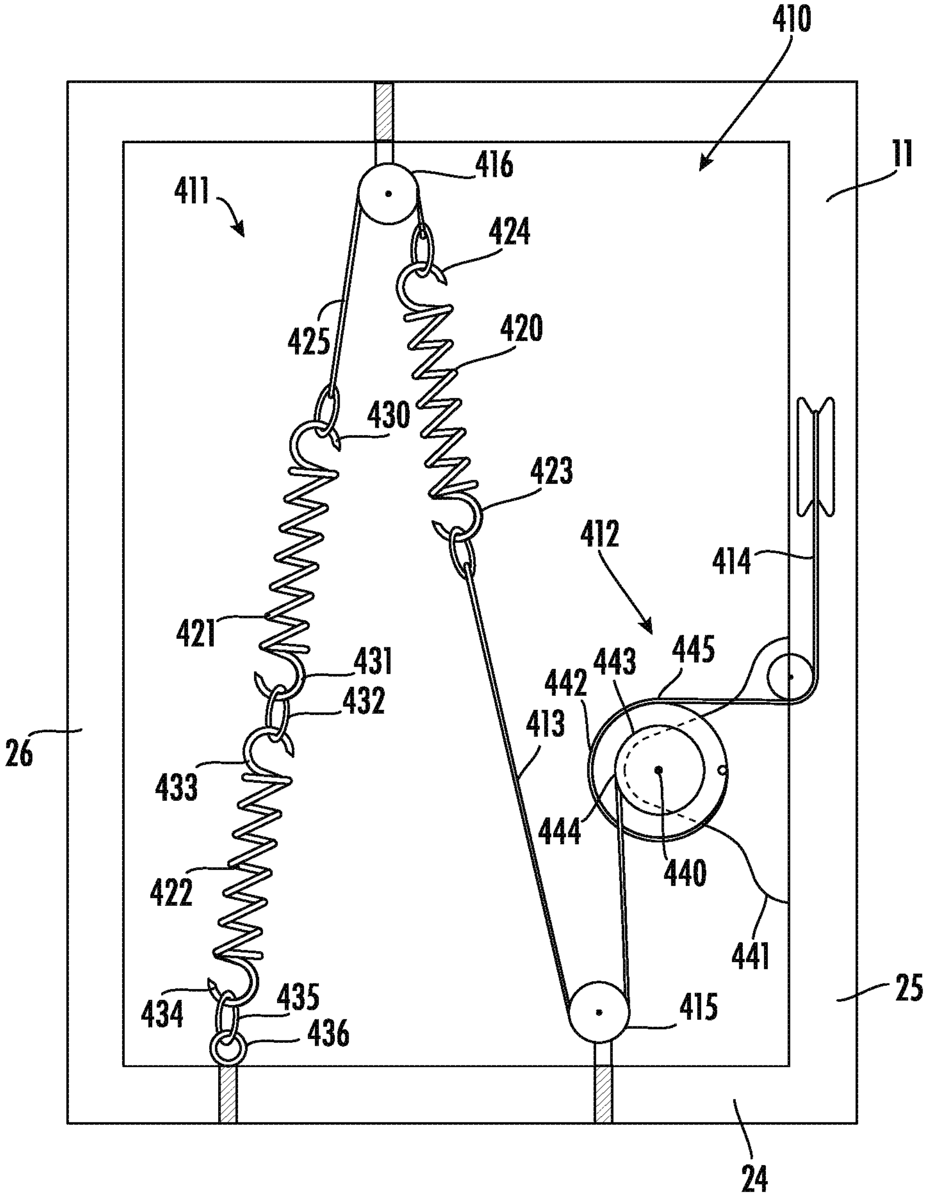
FIG. 14 is a generalized diagram illustrating another alternate embodiment of a stabilizing unloading assembly.

FIG. 14 illustrates another embodiment of a stabilizing assembly 410. The drawings are stylized, free-body diagrams but nevertheless show the structural elements and features of the assembly 410. The stabilizing assembly 410 is positioned within the frame 11 between the front tube 26 (here shown as vertical), the main tube 24, and the vertical tube or housing 25.

The stabilizing assembly 410 includes a spring assembly 411, a cam assembly 412, a first tether 413 extending from the spring assembly 411 to the cam assembly 412, and a second tether 414 extending from the cam assembly 412 and running inside the housing 25, and then preferably extending to the harness 240. The stabilizing assembly 410 exerts a stabilizing force on the harness 240 with respect to the frame 11 to prevent the user from excessive tilt or lean and maintain his posture along or near the line of gravity.

The first tether 413 extends back away from the cam assembly 412, down and around a pulley 415, and to the spring assembly 411. In the embodiment shown here, the spring assembly 411 includes three coiled extension springs 420, 421, and 422 arranged in series with each other. The first spring 420 is a leading spring in that it is connected to the first tether 413. It is disposed between the pulley 415 secured to the main tube 24 and another pulley 416 secured to the top of the frame 11. The first spring 420 has opposed free ends 423 and 424. The free end 423 is coupled to an eyelet, ring, coupler, loop, link, or other end of the first tether 413. The free end 424 is coupled to an eyelet, ring, coupler, loop, link, or other end of an intermediate tether 425.

The intermediate tether 425 extends up from the first spring 420 to the pulley 416 mounted to the top of the frame 11. The intermediate tether 425 routes around the pulley 416 and then extends down to the second spring 421.

The second spring 421 has opposed free ends 430 and 431. The free end 430 is coupled to an eyelet, ring, coupler, loop, link, or other end of the intermediate tether 425. The other free end 431 is coupled to a coupler 432, such as a carabiner or other coupler with a moveable jaw or the like. That coupler 432 connects the second spring 421 and the third spring 422 directly.

The third spring 422 has opposed free ends 433 and 434. The free end 433 is coupled to the coupler 432 and thus to the second spring 421, and the other free end 434 is coupled to another coupler 435 (such as a carabiner, coupler with a moveable jaw, or the like) that is secured to an anchor 436 fixed to the main tube 24.

In some embodiments, the first, second, and third springs 420, 421, and 422 are identical and have a linear or constant spring rate, such that they each deform evenly across their lengths in response to application of force. In other embodiments, the identical springs have dual, progressive, variable, or other types of spring rates.

In still other embodiments, the first, second, and third springs 420, 421, and 422 are not identical. For example, in some embodiments, the spring constant of the second spring 421 is higher than the spring constant of the first spring 420, and the spring constant of the third spring 422 is higher than the spring constant of the second spring 421. In other embodiments, the first, second, and third springs 420, 421, and 422 have other different spring constants with respect to each other.

FIG. 14 shows the spring assembly 410 in an unloaded position, in which the first, second, and third springs 420, 421, and 422 are either unloaded or only very lightly loaded. The unloaded spring assembly 410 has a shorter overall length. The spring assembly 410 moves into or toward a loaded position when the stabilizing assembly 410 is placed under a load that a user produces when walking, leaning, or moving. The spring assembly 410 moves toward the cam assembly 412 during movement.

The cam assembly 412 is mounted for rotation on an axle 440 carried on a bracket 441. The bracket 441 is secured to the housing 25 and extends forwardly. The cam assembly 412 includes outer and inner cams 442 and 443. The stacked cam assembly 412 includes outer and inner cams 442 and 443, mounted coaxially side-by-side on the bracket 441. Both cams 442 and 443 are mounted for rotation about the same axis of rotation, however, the cams 442 and 443 are fixed to each other to prevent relative rotation.

The outer cam 442 is larger, and the inner cam 443 is smaller. Both cams 442 and 443 are circular wheels or discs in this embodiment. They are concentric to each other but the axle 440 about which they are mounted is not concentric, and therefore the cams 442 and 443 are eccentrically mounted. In other words, their axes of rotation are offset from their respective geometric centers, such that as they rotate, their lever arms change and the ratio of their respective lever arms change. In other embodiments, the axle 440 is mounted concentrically to the cams 442 and 443, and in other embodiments, the cams 442 and 443 have shapes other than circles.

The first tether 413 is an inelastic cable, band, cord, or other tether. One end of the first tether 413 is coupled to the free end 423 of the first spring 420, and the other end of the first tether 413 is coupled to the inner cam 443. The inner cam 443 has at least a single groove formed into its perimeter, and as the inner cam 443 rotates, the first tether 413 rolls and unrolls from this groove.

Similarly, the second tether 414 is an inelastic cable, band, cord, or other tether. One end of the second tether 414 is coupled to the outer cam 442. From there, the second tether 414 extends up through the housing 25 and then out to the harness 240. Though the harness 240 is not shown in FIG. 14, the reader will understand its location and arrangement from the description above. The outer cam 442 has at least a single groove formed into its perimeter, and as the outer cam 442 rotates, the second tether 414 rolls and unrolls from this groove.

The first and second tethers 413 and 414 are arranged oppositely to each other on the cam assembly 412. The first tether 413 is secured at an attachment point 444 on the inner cam 443 and extends generally downward to the pulley 415 before turning upward to the spring assembly 411. The second tether 414 is wound around the outer cam 442 and secured at an attachment point 445 and extends generally upward. The attachment points 444 and 445 are not proximate to each other on the cam assembly 412. In other embodiments, the attachment points 444 and 445 may be in different locations, but the tethers 413 and 414 extend outward in opposite directions.

As the user walks, the stabilizing assembly 410 cycles between the loaded and unloaded positions. The stabilizing assembly 410 produces a stabilizing force in opposition to the pull force created by the user's motion, acting to maintain the user in stability and in balance.

A preferred embodiment is fully and clearly described above so as to enable one having skill in the art to understand, make, and use the same. Those skilled in the art will recognize that modifications may be made to the description above without departing from the spirit of the specification, and that some embodiments include only those elements and features described, or a subset thereof. To the extent that modifications do not depart from the spirit of the specification, they are intended to be included within the scope thereof.

What is claimed is:

1. A bodyweight stabilizing locomotive device comprising:
- a frame configured to support locomotive movement; and
- a stabilizing assembly carried by the frame and comprising:
  - a first spring assembly with a first spring constant;
  - a second spring assembly with a second spring constant different from the first spring constant; and
  - a third spring assembly with a third spring constant different from the first and second spring constants;
- at least one of the first, second, and third spring assemblies includes a lockout means which prevents extension of the one of the first, second, and third spring assemblies beyond a maximum extension.

2. The bodyweight stabilizing locomotive device of claim 1, wherein at least two of the first, second, and third spring assemblies are arranged in series with each other.

3. The bodyweight stabilizing locomotive device of claim 1, wherein at least one of the first, second, and third spring assemblies comprises two springs arranged in series with each other.

4. The bodyweight stabilizing locomotive device of claim 1, wherein at least one of the first, second, and third spring assemblies comprises two springs arranged in parallel with each other.

5. The bodyweight stabilizing locomotive device of claim 1, wherein a tether connects the first spring assembly to the second spring assembly.

6. The bodyweight stabilizing locomotive device of claim 1, wherein at least one of the first or second spring assemblies includes a first cable, extending from a first end of the respective first or second spring assemblies, which is interconnected with a second cable, extending from an opposed second end of the respective first or second spring assemblies.

7. A bodyweight stabilizing locomotive device comprising:
- a frame configured to support locomotive movement; and
- a stabilizing assembly carried by the frame and comprising:
  - a first spring assembly with a first spring constant;
  - a second spring assembly with a second spring constant different from the first spring constant; and
  - a third spring assembly with a third spring constant different from the first and second spring constants;
- wherein at least two of the first, second, and third spring assemblies are arranged in series; and
- at least one of the first, second, and third spring assemblies comprises an extension spring, a first cable extending from a first end of the extension spring and having a first cable loop, and a second cable extending from a second end of the extension spring and having a second cable loop, wherein the first and second cable loops are interconnected.

8. The bodyweight stabilizing locomotive device of claim 7, wherein the first and second cable loops are interconnected within the extension spring.

9. The bodyweight stabilizing locomotive device of claim 7, wherein the first and second cable loops are inextensible.

10. The bodyweight stabilizing locomotive device of claim 7, wherein the first and second cable loops have inelastic material characteristics.

11. The bodyweight stabilizing locomotive device of claim 10, wherein the first and second cable loops are inflexible in one direction but are flexible in other directions.

12. The bodyweight stabilizing locomotive device of claim 7, wherein at least one of the first, second, and third spring assemblies comprises two springs arranged in series with each other.

13. The bodyweight stabilizing locomotive device of claim 7, wherein at least one of the first, second, and third spring assemblies comprises two springs arranged in parallel with each other.

14. The bodyweight stabilizing locomotive device of claim 7, wherein a tether connects the first spring assembly to the second spring assembly.

15. A bodyweight stabilizing locomotive device comprising:

a frame configured to support locomotive movement; and a stabilizing assembly carried by the frame and comprising:

a first spring assembly with a first spring constant and a first lockout means which prevents extension of the first spring assembly beyond a first maximum extension;

a second spring assembly with a second spring constant different from the first spring constant and a second lockout means which prevents extension of the second spring assembly beyond a second maximum extension; and a third spring assembly with a third spring constant different from the first and second spring constants.

16. The bodyweight stabilizing locomotive device of claim 15, wherein at least two of the first, second, and third spring assemblies are arranged in series.

17. The bodyweight stabilizing locomotive device of claim 15, wherein at least one of the first, second, and third spring assemblies comprises two springs arranged in series with each other.

18. The bodyweight stabilizing locomotive device of claim 15, wherein at least one of the first, second, and third spring assemblies comprises two springs arranged in parallel with each other.

19. The bodyweight stabilizing locomotive device of claim 15, wherein a tether connects the first spring assembly to the second spring assembly.

20. The bodyweight stabilizing locomotive device of claim 15, wherein at least one of the first or second spring assemblies includes a first cable, extending from a first end of the respective first or second spring assemblies, which is interconnected to a second cable, extending from a second end of the respective first or second spring assemblies.

* * * * *